United States Patent [19]
Chaum et al.

[11] Patent Number: 5,956,400
[45] Date of Patent: Sep. 21, 1999

[54] PARTITIONED INFORMATION STORAGE SYSTEMS WITH CONTROLLED RETRIEVAL

[75] Inventors: David Chaum, Sherman Oaks, Calif.; Niels T. Ferguson, Amsterdam, Netherlands; Berry Schoenmakers, Amsterdam, Netherlands; Erik W. Voskuil, Amsterdam, Netherlands

[73] Assignee: DigiCash Incorporated, Palo Alto, Calif.

[21] Appl. No.: 08/684,263

[22] Filed: Jul. 19, 1996

[51] Int. Cl.[6] .............................. H04L 9/00; H04L 9/30; G06F 17/30
[52] U.S. Cl. .................................... 380/4; 380/9; 380/23; 380/25; 380/28; 380/30; 380/49; 380/50; 707/1; 395/186
[58] Field of Search ............................ 380/4, 9, 28, 49, 380/50, 59, 30, 23, 25; 395/186, 187.01, 188.01; 707/1

[56] References Cited

U.S. PATENT DOCUMENTS

| | | |
|---|---|---|
| 4,949,380 | 8/1990 | Chaum . |
| 4,996,711 | 2/1991 | Chaum . |
| 5,065,429 | 11/1991 | Lang ......................................... 380/25 |
| 5,191,611 | 3/1993 | Lang ......................................... 380/25 |
| 5,224,162 | 6/1993 | Okamoto et al. . |
| 5,420,926 | 5/1995 | Low et al. . |

FOREIGN PATENT DOCUMENTS

0662673 A2   12/1994   European Pat. Off. .

OTHER PUBLICATIONS

Chaum "Untraceable Electronic Mail, Return Addresses, and Digotal Pseudonyms", Communications Of The ACM, Feb. 1981, vol. 24, No. 2.

*Primary Examiner*—Bernarr E. Gregory
*Attorney, Agent, or Firm*—Nixon & Vanderhye P.C.

[57] ABSTRACT

An information storage system includes one or more information update terminals, a mapper, one or more partial-databases, and one or more query terminals, exchanging messages over a set of communication channels. An identifier-mapping mechanism provides (to an update terminal) a method for delegating control over retrieval of the data stored at the partial-databases to one or more mappers, typically operated by one or more trusted third parties. Update terminals supply information, that is stored in fragmented form by the partial-databases. Data-fragment identifiers and pseudonyms are introduced, preventing unauthorized de-fragmentation of information—thus providing compliance to privacy legislation—while at the same time allowing query terminals to retrieve (part of) the stored data or learn properties of the stored data. The mapper is necessarily involved in both operations, allowing data access policies to be enforced and potential abuse of stored information to be reduced. Introduction of multiple mappers acts to distribute information retrieval control among multiple trusted third parties. Introducing so-called 'groupers' increases the efficiency of data retrieval for a common set of queries and further reduces potential abuse of information.

54 Claims, 8 Drawing Sheets

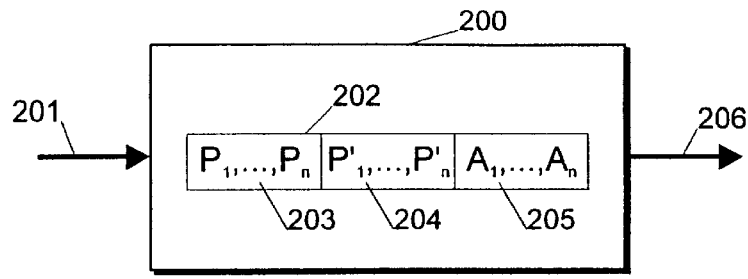
201: $(ENC_{pk\_map}(D_1), A_1, P_1, \ldots, ENC_{pk\_map}(D_n), A_n, P_n)$
206: $(D_1, A_1, P'_1), \ldots, (D_n, A_n, P'_n)$
FIG. 2
FIG. 3
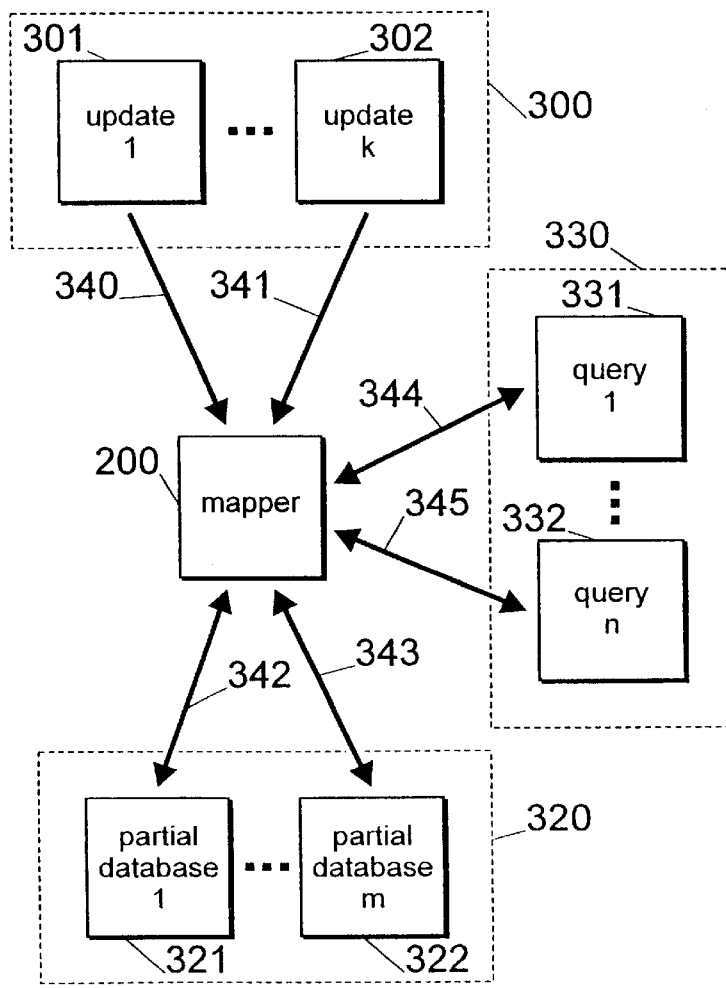

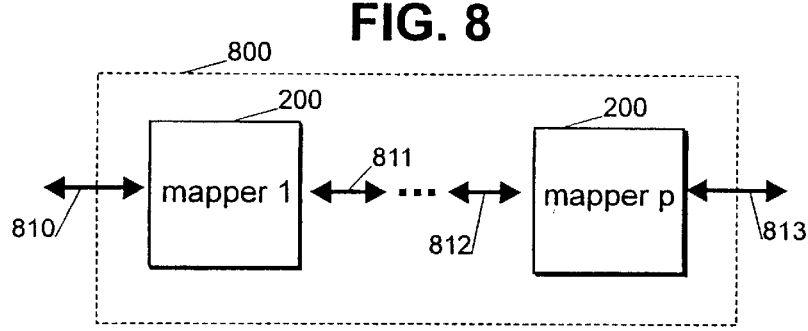
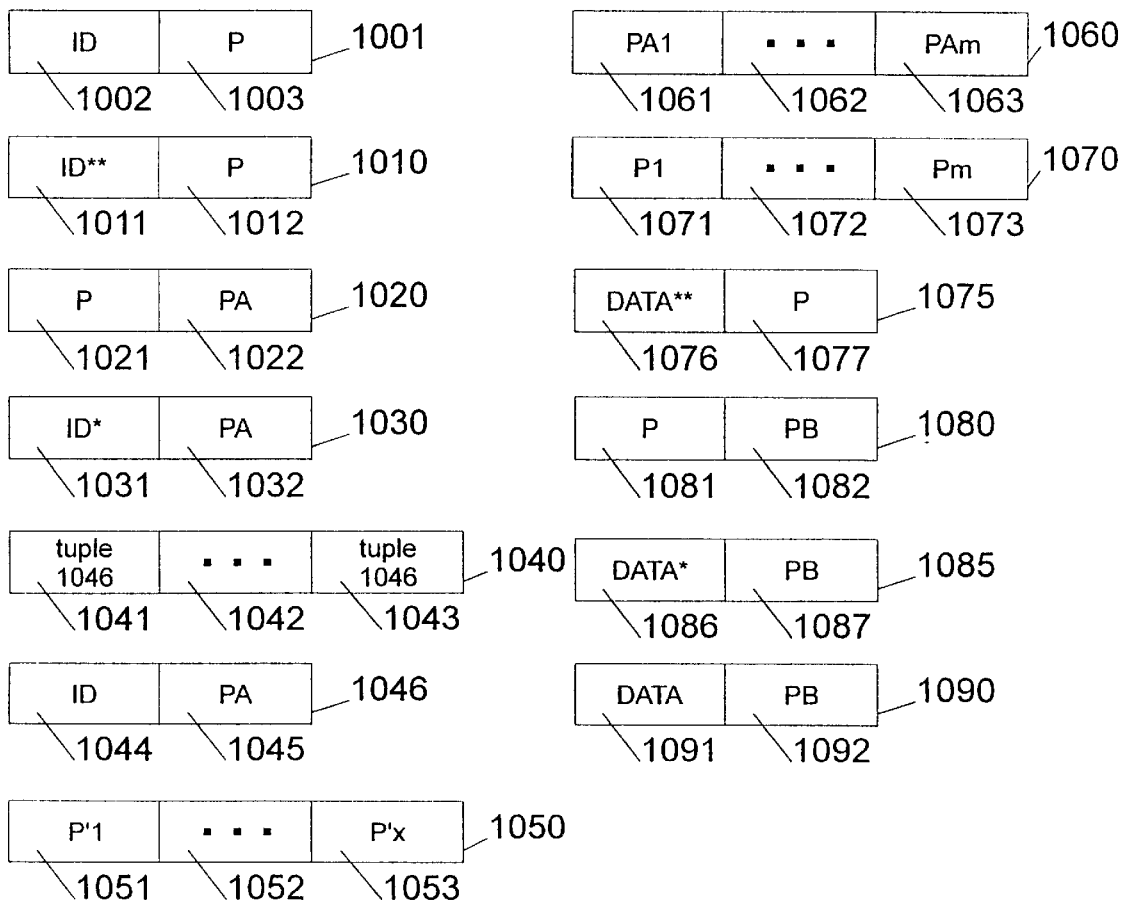

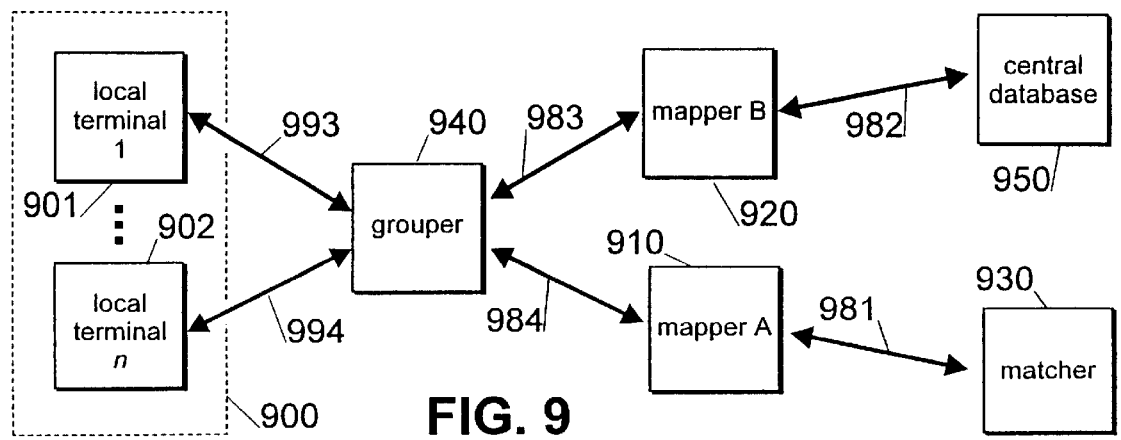
FIG. 9
FIG. 12
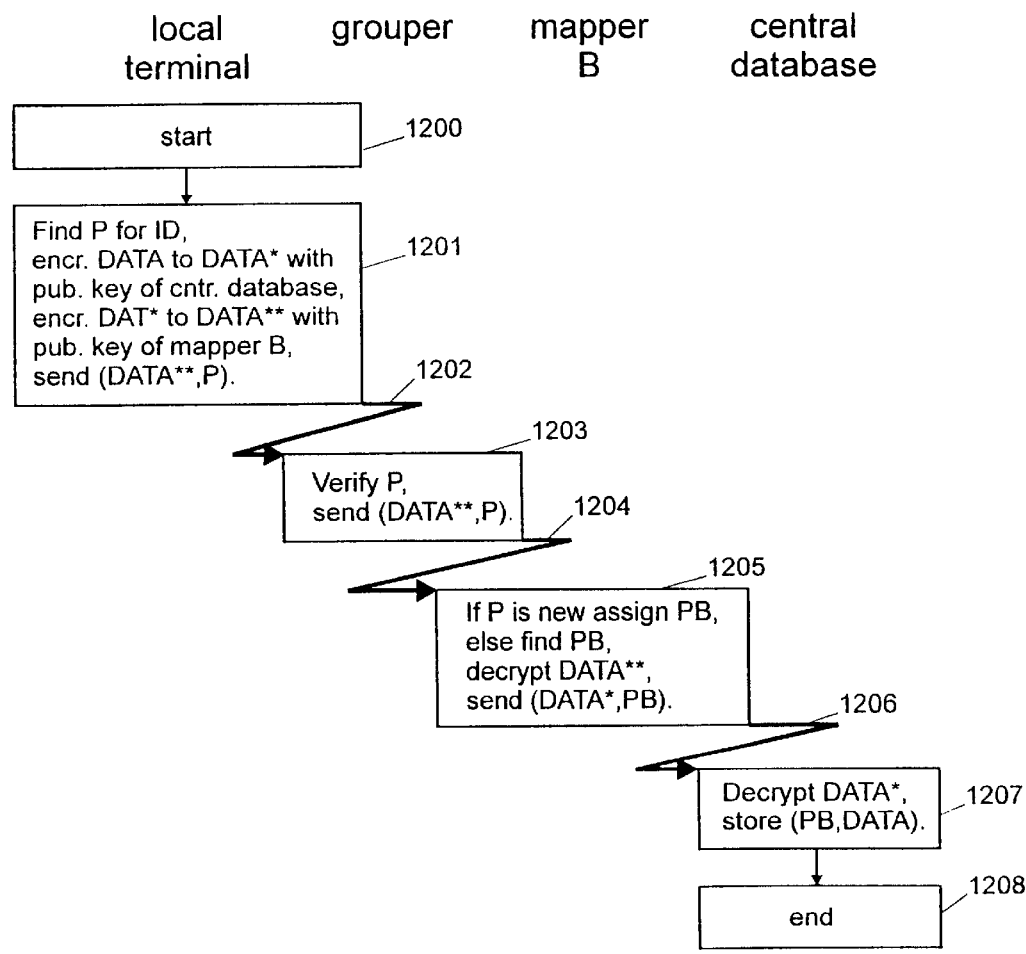

PARTITIONED INFORMATION STORAGE SYSTEMS WITH CONTROLLED RETRIEVAL

BACKGROUND OF THE INVENTION

1. Field of the Invention

This invention relates to systems for protection of information, and more specifically to information storage systems in which information is fragmented and retrieval of information can be controlled by trusted third parties.

2. Description of Prior Art

In *"Principles of Database and Knowledge-Base Systems, volume II"* (Computer Science Press, 1989, ISBN 0-7167-10069-X) by Jeffrey D. Ullman it is described how databases may be fragmented, either vertically or horizontally. However, fragmentation is described only in the context of distributed databases, for increasing efficiency and lowering cost. Vertical fragmentation corresponds to dividing a table into not necessarily disjoint subsets of columns (i.e. breaking up the rows). Horizontal fragmentation corresponds to dividing a table into not necessarily disjoint subsets of rows (i.e. breaking up the columns). Also, a technique is known, in the prior art, for introducing a unique identifier for each record, inserted to enable handling of updates of these records in distributed databases. The above ideas have been expressed in various places throughout the literature.

In *"Cryptography and Data Security"* (Addison-Wesley, 1982, ISBN 0-301-10150-5) by Dorothy Denning it is described how sensitive information (in general, information that is not meant to be public) that is stored in a database can be protected by a strict policy to restrict retrieval to certain allowed queries. Although many such techniques have been proposed, they are limited in the sense that, when evaluating whether or not to allow a certain query, it is often impossible to take into consideration all previously allowed queries, because a complete and reliable query history can not be established. Moreover, all these proposals lack countermeasures against abuse of the database by an insider.

Forced centralized retrieval, as offered by the present invention, potentially increases the control over allowed queries.

In *"Untraceable Electronic Mail, Return Addresses, and Digital Pseudonyms"* (Communications of the ACM, February 1981, Volume 24, Number 2) by David Chaum, one of the present applicants, the notion of a so-called mix is introduced to achieve electronic mail systems in which the sender remains unknown to the receiver. Messages are sent via the mix-operated by a trusted third party. Encryption by the sender of the message with the public key of the designated receiver, and of the designated receiver's address with the public key of the trusted third party, ensures that only the intended receiver can read the content of the message, and that the message can only reach the receiver via the trusted third party. When forwarding the message, this party does not reveal the identity of the sender to the receiver. Instead of a single mix, a series, of any number, of mixes can be used as well.

Forcing messages to be routed via trusted third parties, by applying the mix mechanism, is fundamental to achieving the property of controlled information retrieval achieved by the present invention.

Steven H. Low, Nicolas F. Maxemchuk, et al. from AT&T Bell Labs wrote several papers on privacy protection for credit card systems (*"Anonymous Credit Cards"*, Proceedings of the $2^{nd}$ ACM Conference on Computer and Communications Security, November 2–4, 1994), a health insurance architecture, and other systems—all introducing similar architectures and methods. Central to their approach is the use of so-called double-locked boxes—an application of the mix mechanism as introduced by Chaum—and the introduction of pseudonyms for individuals. In their systems, information-storing parties identify individuals under a pseudonym. The correspondence between the real-life identity and a set of pseudonyms relating to an individual is only known to this individual. As a result of this, individuals have to take an active part in the system during most operations. However, in many applications it is not needed, not wanted, or simply impossible to require individuals to take part in each data retrieval procedure involving information regarding these individuals. Furthermore, in practice, the storage of the pseudonyms by the individual, and the construction of double-locked boxes by the individual, requires that individuals carry a device suitable for performing this function.

In the present invention, individuals may delegate control over retrieval of information to one or more trusted third parties. When control is delegated to multiple trusted third parties, all parties have to consent, and indeed cooperate, before access is granted. Individuals are not required to carry a device.

All current databases, and the techniques described in the above-mentioned publications, suffer from two additional major drawbacks. First, information can easily be abused when it is stored centrally or distributed but insufficiently de-fragmented, or when it can be retrieved otherwise without restrictions. Privacy legislation is both a reaction to, and an impediment to such systems. This is increasingly generating a demand for databases that cannot be abused in this way, but which can still provide the same functionality. A second drawback is that access policies required by the parties that supply the information, rely on agreements, legislation and trust; a situation that also conflicts with changing privacy legislation and increasing popular demand for reduction in the potential for abuse of provided information. The present, innovative system overcomes these drawbacks by means of methods and apparatuses for secure data-storage that allow the introduction of trusted third parties who can directly enforce access policies, and still provide all desired functionality in an efficient way.

BRIEF SUMMARY OF THE INVENTION

Accordingly, the herein disclosed exemplary embodiment of the present invention:

- provides secure, flexible and automatable database methods and apparatuses for storing and retrieving sensitive information;
- protects against unauthorized use of stored data, by storing fragmented data in separate locations and/or parties, thus providing security, privacy, and compliance with privacy legislation;
- protects against unauthorized (partial) de-fragmentation of stored data, by distributing data access-control, allowing an arbitrary number of parties to share data access-control, and thus providing security, privacy, and compliance with privacy legislation;
- provides methods and apparatuses for parties within the system to enforce data access-control policies;
- protects against unauthorized (partial) de-fragmentation of stored data in cases where several parties within the system collude;
- minimizes the amount of compromised data resulting from malicious parties gaining control over parts of the stored data;

minimizes the amount of information learned by parties in the system from data storage and retrieval operations;

in so-called dossier systems, protects against parties acquiring information which relates to accesses of an individual's dossiers (e.g. access frequency and access time);

provides methods and apparatuses for merging existing databases into a fragmented database with controlled retrieval;

and, allows efficient, economical and practical apparatuses and methods which fulfill the other objects of the invention.

Other objects, features, and advantages of the present invention will be appreciated when the present description of an exemplary embodiment and appended claims are read in conjunction with the accompanying drawings.

In accordance with the foregoing and other objects of the present invention, a brief summary of some of the inventive techniques will be given. Some simplifications and omissions may be made in this summary, which is intended to highlight and introduce some aspects of the present invention, but not to limit its scope in any way. Detailed descriptions of preferred exemplary embodiments adequate to allow those of ordinary skill in the art to make and use the inventive techniques are provided later.

We consider a simple example system for centrally storing patient medical data provided by multiple physicians. Instead of storing all data in a single database, we fragment the data and store different fragments in different databases. The example system consists of two databases, one containing all the medical data, and the other containing all the identifying information.

Each new patient medical record entered by a physician into his terminal is split into two fragments: a fragment containing only medical information, and a fragment containing only patient identifying information. These fragments are sent by this terminal to an apparatus operated by a trusted third party, that forwards the fragments to the respective databases. Every fragment is given a unique identifier in such a way that these identifiers themselves do not reveal the correspondence between the two fragments. The correspondence between the identifiers, (and thus the correspondence between the data-fragments), is known only to the trusted third party. Bringing about this correspondence is referred to as mapping, and the apparatus handling the mapping is accordingly referred to as mapper. The correspondence is stored by the mapper.

The use of appropriate mix mechanisms ensures that the mapper cannot be bypassed. It also ensures that forwarded data can only be processed by the intended apparatuses (i.e. the respective databases). Furthermore, it enables communication over unsecured, arbitrarily configured datachannels.

In the example system, although the information stored in both databases may be freely available (and can be used, for instance, for statistical research), the two databases together do not contain enough information to recover the medical information of an individual patient. Retrieval of this information (that is de-fragmentation of the stored data) requires the cooperation of the two databases and the mapper (operated by the trusted third party). Thus, the extent to which stored data can be de-fragmented can be fully controlled by the trusted third party.

Data is retrieved from the system by submitting queries to the mapper. A possible query could be "Has this patient been prescribed conflicting drugs by different physicians?". The mapper answers this query by first having the database with the patient-identifying information generate a list of fragment identifiers that all refer to the patient in question. The mapper then translates this list into a list of fragment identifiers of medical information fragments that belong to the patient. The translated list is sent to the database that contains the medical records, which retrieves all related records and checks for drug conflicts. By masking data so it can only be read by the designated parties (by means of encryption techniques), throughout this process none of the parties operating mapper and databases have learned anything about the information stored at the other parties, other than the physician, who learned whether or not a drug conflicts with other drugs prescribed to his patient. The trusted third party only learns that a certain physician requests a query; it does not know the identity of the patient, nor the nature of the query. The doctor does not learn any medical data regarding this patient that is irrelevant to him at this moment, he does not even learn what other drugs are prescribed, only that they conflict. The party operating the database storing the medical data does not know the identity of the patient visiting the physician. The party operating the database storing the identifying information knows the identity of the patient, but does not know which physician this person is visiting, nor the nature of the query.

The present invention also allows reduction of the frequency of access to identifying information. This frequency in itself can be sensitive information. In the example, we can hide from the party operating the database that contains the patients' identifying information the number of times the patients' medical information is accessed. The database holding the identifying information does not have to be involved in query operations. To achieve this, pseudonyms are introduced for each patient at each physician. These pseudonyms are used by the physicians' terminal instead of the patient's identifying information. Different pseudonyms for the same patient are used at each physician. An apparatus at the trusted third party will keep track of the correspondences between all these pseudonyms (i.e. which pseudonyms belong to the same individual). Keeping track of this correspondence is referred to as grouping (of pseudonyms), and the apparatus performing this functionality is called a grouper. It is understood that mapping and grouping can be combined.

All pseudonyms relating to a person are chosen so they cannot be traced to the individual or linked to each other except by the intended party. The trusted third party does not know to which individual a set of pseudonyms belong. When a patient is given a new pseudonym, the database containing the identifying information is used to match the pseudonym to the other existing pseudonyms. The apparatus performing this matching is referred to as matcher.

The introduction of pseudonyms also provides an efficient query mechanism, since the matching of identifying information (potentially a time consuming operation) is performed only once per patient, prior to queries.

BRIEF DESCRIPTION OF THE DRAWINGS

FIGS. 3, 4, 5, 6, 7 and 8 are part of the description of a first preferred embodiment of a database system, while the other figures are part of the description of a second preferred embodiment of a database system:

FIG. 1 shows a diagrammatic view of an exemplary embodiment of the present invention;

FIG. 2 shows a combination block and functional diagram of a preferred embodiment of the mapping mechanism performed by a mapper, in accordance with the teachings of the present invention;

FIG. 3 shows a combination block and functional diagram of a first preferred embodiment of a database system involving a single mapper (from FIG. 2) and three groups of respectively update, query and partial-databases, in accordance with the teachings of the present invention;

FIG. 4 is a block diagram showing data-objects constructed and stored by the partial-databases of FIG. 3 in the add-record process of FIG. 5 and retrieved by those partial-databases in the query process of FIG. 7, in accordance with the teachings of the present invention;

FIG. 5 shows a flowchart of a preferred embodiment of an add-record process in accordance with the teachings of the present invention, involving actions by an update terminal, a mapper, and multiple partial-databases (all of FIG. 3), which is believed to store data fragmented so that the mapper can control the access thereto, and the query terminal can perform query processes similar to the query process of FIG. 7 to retrieve (parts of) the stored information;

FIG. 6 is a block diagram showing data-objects constructed, sent, received, processed, and/or stored by the apparatuses of FIG. 3 in the query process of FIG. 7, in accordance with the teachings of the present invention;

FIG. 7 shows a flowchart of a preferred embodiment of an exemplary query process in accordance with the teachings of the present invention, involving actions by an update terminal, a mapper, and two partial-databases (all of FIG. 3), which is believed to allow retrieval of information stored in the system by means of the add-record process of FIG. 5;

FIG. 8 shows a combination block and functional diagram of a preferred embodiment of a so-called mapping cascade, in accordance with the teachings of the present invention, which is believed to enhance the privacy and security offered by a system such as FIG. 3, when it replaces the mapper in that system;

FIG. 9 shows a combination block and functional diagram of a second preferred embodiment of a database system, in particular a so-called dossier-system, involving five single apparatuses and one group of apparatuses in accordance with the teachings of the present invention;

FIG. 10 is a block diagram showing data-objects constructed, sent, received, processed, and/or stored by the apparatuses of FIG. 9 in the link-dossier operation of FIG. 11, the update-dossier operation of FIG. 12 and the query-dossier operation of FIG. 13, in accordance with the teachings of the present invention;

FIG. 12 shows a flowchart of a preferred embodiment of an update-dossier operation in accordance with the teachings of the present invention, involving actions by a local terminal, a grouper, a mapper B and a central-database (all of FIG. 9), which is believed to store data relating to an individual in his/her dossier using a pseudonym for this individual (obtained by means of a link-dossier operation of FIG. 11) to refer to the dossier;

DETAILED DESCRIPTION OF EXEMPLARY EMBODIMENTS

Figure 1:
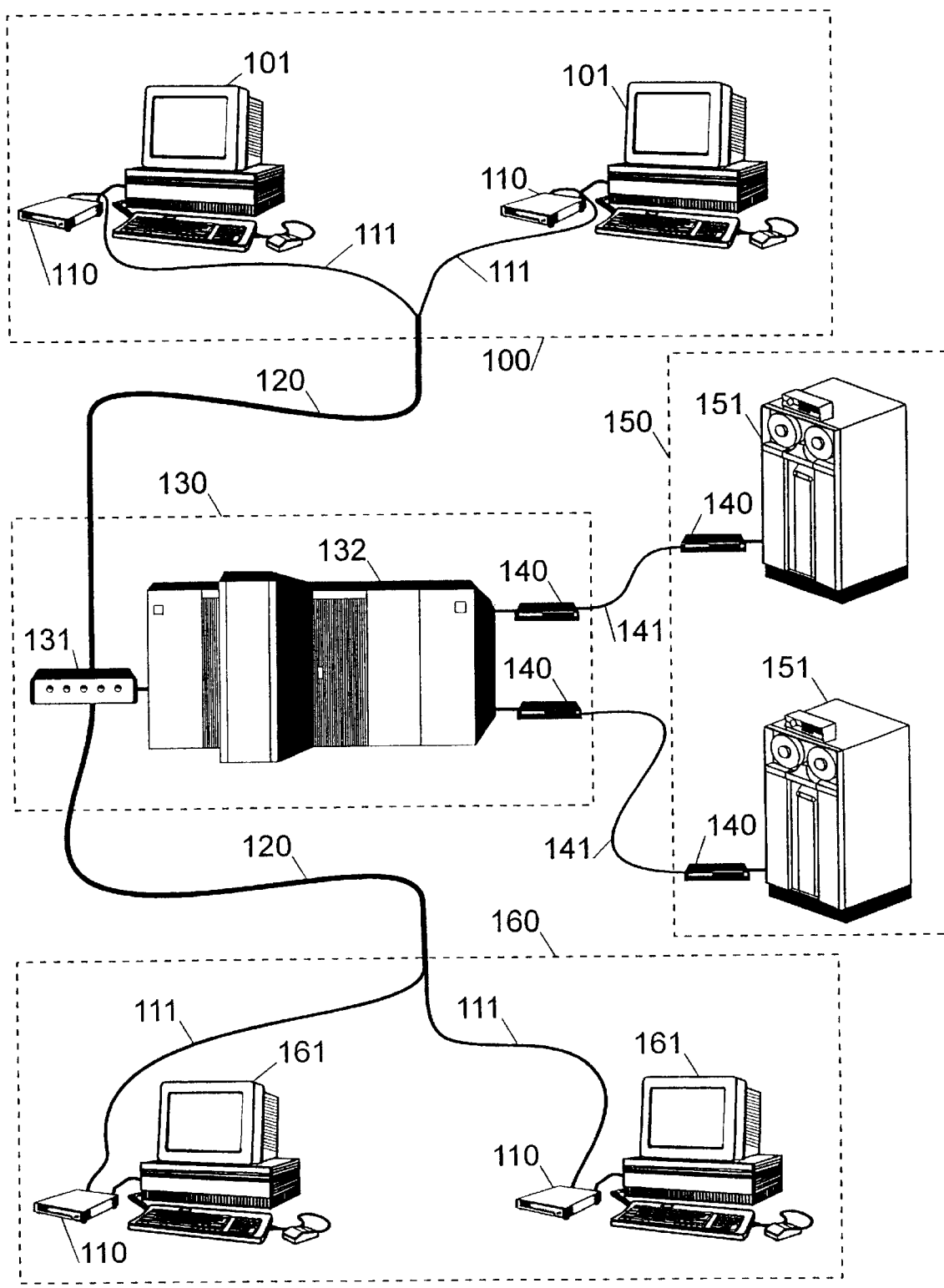
FIG. 1 gives an exemplary embodiment of the present invention, FIG. 2 describes the general mapping mechanism.

The drawing figures and the detailed descriptions provided later make a number of simplifying assumptions for clarity of exposition. It will be appreciated, however, that these should not be taken to limit the scope of the invention. The possible configuration and functionality of the present invention exceeds the configurations and functionality of the presently preferred embodiments described below, at least to the extent that certain arbitrary choices have been made.

Reference numbers in the drawing figures consist of two parts—the two rightmost digits are the index number of an item in a figure, and the other digits are the number of the drawing figure in which the item was introduced.

Finally, some known general cryptographic techniques, like techniques for providing and verifying authentication and encrypting and decrypting data, are assumed without presenting the details of these techniques.

1. Introduction

Turning to FIG. 1, an exemplary embodiment of the present invention is shown, using existing computer hardware and operating systems, specifically configured, and extended with some specific programs. Obviously, numerous alternative configurations may be used, as well as different hardware, operating systems, database programs, physical communication channels and communication protocols.

Data is entered into the system, and also updated, by means of one of the update terminals 100. An update terminal 101 is a standard PC (with an Intel 80486 or Intel Pentium processor), running under the Microsoft Windows 95 operating system. This terminal 101 splits the data, performs the appropriate encryption, and sends the resulting data to the mapper. To connect to the mapper 130, this PC is equipped with a standard asynchronous modem 110. This modem 110 connects with a cable 111 to the public telephone network 120. When storing or updating data, the update terminal 101 dials up the mapper 130.

The mapper 130 consists of 132, a Sun Sparc 20, equipped with a Sybase database (used to store the corresponding fragment-identifiers and pseudonyms). To allow multiple terminals to connect simultaneously, the mapper 130 is equipped with 131, a modem-pool and a Transpac X25 ISDN data switching network, connecting the incoming lines from 120 to 132. The mapper 130 processes the message from the update terminal (by performing the necessary decryption and mapping of identifiers) and sends the data-fragments to the appropriate partial-databases of the group of partial databases 150. The mapper 130 connects to a database 151 by means of an ISDN modem 140. Data is transferred using a dedicated ISDN line 141.

The database 151 is also equipped with a modem 140. Depending on the amount of data to be stored and retrieved, and the desired response time, the database 151 can range from a standard PC (Intel Pentium processor and 32 MB of RAM), equipped with the Microsoft Windows NT operating system, running a Microsoft SQL Server database engine, to a Sun Sparc 2000 station and a Sybase database engine. The database 151 stores the received data-fragments on a disk medium.

Data is retrieved by means of one of the query terminals 160. A query terminal 161 is similar to the update terminal 101. It transfers the query to the mapper 130. This mapper retrieves the data from the appropriate databases, and returns an answer. The query terminal connects to the mapper 130 by calling in, over the public telephone network 120, with a modem 110. All machines mentioned use DEC MessageQ to communicate.

The grouping of identifiers (pseudonyms) may additionally be performed by the mapper, or a machine configured similar to a mapper, placed in between modem pool 131 and mapper 132.

In the following drawings, for reasons of clarity, the physical apparatuses involved are shown in an abstract manner. In the accompanying text, they are sometimes referred to as entities or parties. Lines and arrows in the drawing figures represent the apparatuses and/or methods for effecting the transfer of data, which may be held initially or delayed on their way, passed through various apparatuses, encoded and decoded, cryptographically or otherwise, to provide their authenticity and/or secrecy and/or error detection and/or error recovery. In the text, the transfer of data is referred to as sending a message and receiving a message, without referring to the actual physical process. All apparatuses involved in the presented embodiments have a suitable means for retaining and retrieving data, on some physical media (e.g. tape or disk). For clarity, in the text below, this is referred to store data and retrieve data, without referring to the actual physical process.

Furthermore, it is assumed that each of the parties has a means of protecting their equipment against abuse, by restricting access to the relevant apparatuses to authorized persons—either physically, by locking these apparatuses, or logically, by means of requiring passwords and/or storing data in an encrypted form. In the last case the decryption keys will be supplied only to authorized persons. The way this functionality is achieved can be either manual or automated, or in some mixed form.

2. The General Mapping Mechanism

Turning to FIG. 2, the general mapping mechanism performed by mapper 200 is described. The mechanism starts when the mapper receives a message 201. This message consists of n groups of three data-elements, each of the form:

$$ENC_{pk\_map}(D_x), A_x, P_x,$$

where n is an integer value, and x is an integer value between 1 and n. Furthermore, $ENC_{pk\_map}(D_x)$ is some arbitrary data $D_x$, encrypted with the public key of the mapper, $A_x$ is the addressee of the data, and $P_x$ is an identifier, used by the sender of message 201 to refer to data $D_x$.

Upon receipt of this message, the mapper verifies whether it has received the identifiers $P_1, \ldots, P_n$ previously, by searching the first field 203 of a list of data-elements 202 in a suitable data representation physical medium. In the case $P_1, \ldots, P_n$ is found, in the next step of the mechanism the mapper uses the identifiers $P'_1, \ldots, P'_n$ stored in the second field 204 of the data-element. Otherwise, if $P_1, \ldots, P_n$ is not found, n unique and so far unused identifiers $P'_1, \ldots, P'_n$ are chosen by the mapper to be used in the next step.

In the next step, using his private key, the mapper decrypts the n pieces of encrypted data to reveal $D_1, \ldots, D_n$. It then sends these results in n messages (206) to the appropriate addressees (as specified in $A_1, \ldots, A_n$). Each of the n messages has the following form:

$$(D_x, A_x, P'_x).$$

The receiver $A_x$ will associate the identifier $P'_x$ with the received data $D_x$. When new $P'_1, \ldots, P'_n$ were chosen by the mapper, the mapper adds to the list a data-element 202 containing $P_1, \ldots, P_n$ in field 204, the identifiers $P'_1, \ldots, P'_n$ in field 203, and addressees $A_1, \ldots, A_n$ in field 205.

It will be obvious to a person of ordinary skill in the art that the chosen identifiers can be generated by the mapper, or be generated in cooperation with other apparatuses. This fragment identifier should be chosen so it cannot be linked to the data by anything other than the mapper. In this respect, for instance, a unique, unused, randomly generated integer may be used.

When multiple data-fragments are presented in one message 201 (in other words, when the value of n is greater than 1), by storing the identifiers together, the mapper records the correspondence between these fragments. This is referred to as linking identifiers. The mechanism of replacing the identifiers $P_x$ with $P'_x$ is referred to as mapping identifiers.

3. Detailed Description Of The First Preferred Embodiment

We continue with a detailed description of a first preferred embodiment of the inventive techniques.

3a. Overview

Turning to FIG. 3, the respective apparatuses of a database system and their interconnections are shown.

The apparatuses that are used to supply and refresh information (to be) stored in the system will be referred to as update terminals. Box 300 represents one or more update terminals. Two update terminals, labelled 301 and 302, are shown here for illustrative purposes. The number of update terminals is denoted by k. It will be appreciated that the precise number of update terminals is not essential to the present inventive techniques.

200 is an instance of the mapper, as described in FIG. 2. It controls the access to all the information stored in the database system. It will be understood that although the mapper is referred to as a single entity, it need not actually be so. The mapper may actually correspond to an entire network of entities that are all in charge of controlling the access to the information stored in the system. It is envisioned that in most applications the mapper will be operated by a trusted third party. This trusted third party can be a part of the organization operating the database, but also a government body or, for example, a consumer interest group.

The apparatuses that are used to store (parts of) the information will be referred to as partial-databases. Box 320 represents one or more partial-databases. Two partial-databases, labelled 321 and 322, are shown here for illustrative purposes. The number of partial-databases is denoted by m. Although a system should consist of at least two, the precise number of partial-databases is not essential to the present inventive techniques. All relevant apparatuses contain data about what type of data is stored by which partial-database. Access to the data stored in partial-databases is assumed to be restricted to the respective partial-databases. It will be appreciated that access can be restricted physically—by controlling the area in which the partial-database is stored—and/or logically—by, for example but without limitation, encryption of the stored data or password protection schemes. Such access-control methods are well known, and will not be further discussed here. The goal of the separation of the system into partial-databases is that the partial-databases contain no, or very limited, information that is sensitive when considered in isolation, or even when combined.

The apparatuses that are used to retrieve the information will be referred to as query terminals. Box 330 represents one or more query terminals. Two query terminals, labelled 331 and 332, are shown here for illustrative purposes. The number of query terminals is denoted by n. It may be noted that the number of query terminals is not essential to the present inventive techniques.

It is not excluded that an update terminal and a query terminal correspond to the same entity, and neither is it excluded that the same entity is represented by more than one update terminal and/or query terminal.

Each of the update terminals can send information directly to the mapper through a communication channel, represented by arrows 340 and 341 for update terminals 301 and 302 respectively. Each of the partial-databases can exchange information directly with the mapper through a communication channel, shown here as 342 and 343 for partial-database 321 and 322 respectively. Each of the query terminals can exchange information directly with the mapper through a communication channel, shown here as 344 and 345 for query terminal 331 and 332 respectively. When requested by a neighbor apparatus, all apparatuses will forward messages to enable apparatuses that are not directly connected to exchange information. The communication channels presented here are not necessarily the physical connections between the apparatuses. Messages may be routed arbitrarily, the only restriction being that messages have to travel in the right order through the apparatuses relevant to the mix mechanism.

Three basic operations are supported by the system: adding a new record, updating an existing record and performing a query. It will be appreciated that, depending on the application of the invention and/or on the jurisdictional domain in which it is operated, certain legal restrictions may apply to the operations and/or results thereof. Additional restrictions may be laid down in agreements between the update terminals, the mapper and the partial-databases.

3b. The Add-Record Process

Figure 4:
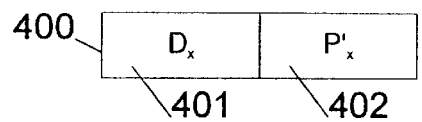
Figure 5:
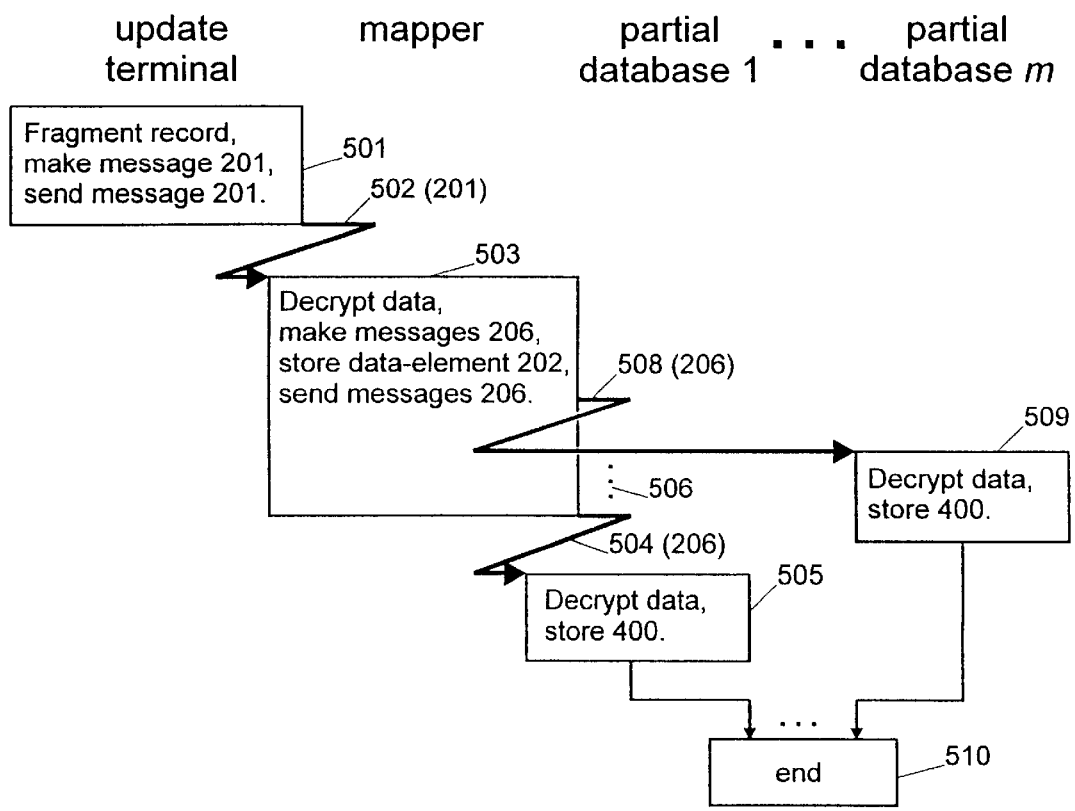

Turning now to FIG. 5, the process of adding a record, in which an update terminal 301 or 302, the mapper 200, and the partial-databases 320 participate is shown. FIG. 4, shows a data-element subjected to this process.

When one of the update terminals has new information to store it starts the process in step 501. The update terminal in question separates the input record into m data-fragments $D_1, \ldots, D_m$ (n of FIG. 2 equals m). We will refer to the fragmentation of single data records as vertical fragmentation. The update terminal in question furthermore assigns each of the fragments to one of the partial-databases (the addressees mentioned in FIG. 2). The way in which an input record is separated into fragments may vary between different applications of the inventive techniques, (i.e. each piece of information in the record may occur in none of the fragments, one of the fragments, several fragments or even in all fragments). It is envisioned that in some cases the separation into fragments and assignment to partial-databases will vary from record to record, but in many situations the separation and assignment will be similar for all records. Although in this preferred embodiment the data is divided over all partial-databases in the system, in other respects this division is to be considered an example, and not intended to limit the scope of the present invention. The update terminal constructs a message 201 (as described in relation to FIG. 2) by assigning fragment identifiers $P_1, \ldots, P_m$ to the fragments, and encrypting the fragments with the public key of the mapper. It will be obvious to those of ordinary skill in the art that the update terminal can encrypt the data-fragment beforehand in such a way that the assigned partial-database can decrypt the data-fragment while some or all other parties in the system cannot decrypt the data. This prevents the mapper from collecting a copy of all data stored in the partial databases. It is envisioned that most embodiments will use such an encryption. The last action of 501 is the sending of message 201 to the mapper, in message 502, using the communication channel.

Upon receipt of 201, the mapper starts execution of step 503. As described in relation to FIG. 2, it constructs message 206, by decrypting the data-fragments, and records a data element 202. As the concluding action of step 503, the m messages of 206 are sent to the assigned partial-databases, using the respective communication channels. Of these m messages, two are shown here, 504 and 508. The other messages are depicted by 506. Only the partial-databases that correspond to messages 504 and 508 are shown, the others are omitted from the diagram for clarity.

Upon receipt of the message 504 the first partial-database starts execution of step 505. The partial-database stores a data-element 400, containing the received data-fragment $D_x$ in field 401 and identifier $P'_x$ in field 402. This ends step 505, after which the actions to be performed by these partial-databases in the update process are executed. The process step 509, executed by the other partial-database shown here is similar to step 505, as are the steps executed by the other databases. When all partial-databases have executed their respective steps, the process terminates at step 510.

Application of this process not only fragments the data vertically. Since each record is stored without any reference to other associated records, data is also fragmented horizontally. We refer to this database system as fully fragmented.

3c. The Record-Update Process

Updating a record works along similar lines to the process of adding a record as described in FIG. 5. It starts with an update terminal wishing to update one of the previously submitted records. The update terminal separates the new record into fragments using the same method used for separating the old record. It then forms a message 201, similar to that described above. However, instead of assigning new identifiers, the same identifiers $P_1, \ldots, P_m$ are used as in the add-record process for this record. When it receives the message, the mapper retrieves the associated $P'_1, \ldots, P'_m$ and $A_1, \ldots, A_m$. Using the received update fragments $D'_1, \ldots, D'_m$, and the retrieved information, the mapper then constructs m update messages (206), and sends them to the respective partial-databases, the same way as described in 503. Each partial-database then searches in the data-elements 400 for the $D_x$ it stored with the fragment identifier $P'_x$ and updates the fragment with the received $D'_x$. Deleting a record can thus be considered a special case of updating a record.

3d. The Query Process

Figure 6:

Finally, we consider query operations. We proceed by giving a general description of the process, as performed by the mapper, a query terminal and the partial-databases. FIG. 6, shows a data-element related to this process. A detailed description of an example of a query will be given later in relation to FIG. 7.

A query operation is performed by one of the query terminals 330. It also involves the mapper 200 and the partial-databases 320. The query terminal starts a query by submitting a query request to the mapper. A query request, of which the structure is shown in 600, consists of a data-independent part 601 that is called the query template, and of zero or more data-holding parts called the query felds. Two query fields, 602 and 604, are shown. The other query fields are denoted by 603. The query template consists of a question (or command), formally phrased in some query language. The query template may contain references to data stored in the query fields. The number of query fields and the type of the data in these fields are determined by the query template.

The concept of query languages is well known to persons of ordinary skill in the art. An example is however given. The query "Give the names of all men aged 99" is described by a query template with value "Give all name for which gender=1 and age=2", in which the term shown in underlined italic describes the requested output of the query and the terms shown in italic (whether or not underlined) describe data types. The digits are placeholders for the value of query fields 1 and 2. The example query request consists of two query fields, field 1 with value "male" and field 2 with value "99".

The contents of the query fields can be hidden from the mapper. To this end, the query terminals encrypt these fields for the relevant partial-databases. If a field is relevant to more than one partial-database, it is encrypted for each of these partial-databases separately. Given only the query template in a form readable by the mapper, the mapper may generally be assumed to be able to process the query, for a large class of queries.

When the mapper receives a query request, it first analyses the query template to determine if the query request is allowed by relevant agreements and applicable legislation. In determining which types of queries are allowed, the mapper may also takes into consideration, among possibly other things, related query requests that have been allowed in the past, and related query requests that will be allowed in the future. Finally it considers which kind of data needs to be communicated to and from the partial-databases involved. It is believed that a large class of queries can be processed in this way. In some cases it may be necessary to know the value of one or more query fields to be able to determine if a query-request is allowed. If it is undesirable that the mapper should learn the value of the query-fields, then it is envisioned that the query-request, the relevant query fields, and additional information regarding the database-system are submitted to an independent party that has no access to any of the information stored in the system, and that is trusted by both query terminal and mapper. This independent party can then determine for the mapper if the query is allowed.

The mapper responds to allowed queries by sending back a query answer.

To solve a query request, the mapper processes the query template, and constructs query sub-requests. These query sub-requests are based on the data types used in the query template, the logical structure of the query template, and the fragmentation of the data in the partial-databases. Each query sub-request, like a query request 600, consists of a query template and zero or more query fields. The mapper submits these query sub-requests to the appropriate partial-databases. Each partial-database solves the received sub-query request locally (meaning: by only using locally-stored data), and sends a query sub-answer back to the mapper. Depending on the query template and the fragmentation of the data in the partial-databases, it is possible that the mapper has to construct query sub-requests using query sub-answers received as a response to previously submitted query sub-requests.

When the result of the last submitted query sub-request is received by the mapper, it constructs the final query answer, based on the data types used in the query template, the logical structure of the query template, and the received query sub-answers, and sends this answer to the query terminal.

Data in a query sub-answer can be hidden from the mapper. To this end, in the case that the data is used by the mapper in subsequent query sub-requests, the partial-databases hereto are requested to encrypt these fields for the respective partial-databases. In the case that the data is used by the mapper to construct the query answer, the partial-database is requested to encrypt the data for the appropriate query terminal. To enable the partial-database to encrypt data for a certain entity, the mapper supplies entity-identifying information to the partial-database. Encrypting data for the assumed recipient also ensures that no entity can successfully assume the identity of another entity and request data in that entity's name.

Depending on operational and legal relations between mapper and partial-database, each partial-database may decide to answer a request or not when it receives a query sub-request, based on the query sub-request, using the same method as the mapper. Also, in cases where no encryption of data was requested by the mapper, the partial-database may still decide, (again, possibly based on the query sub-request), to encrypt the data.

3e. A Query Example

Figure 7:
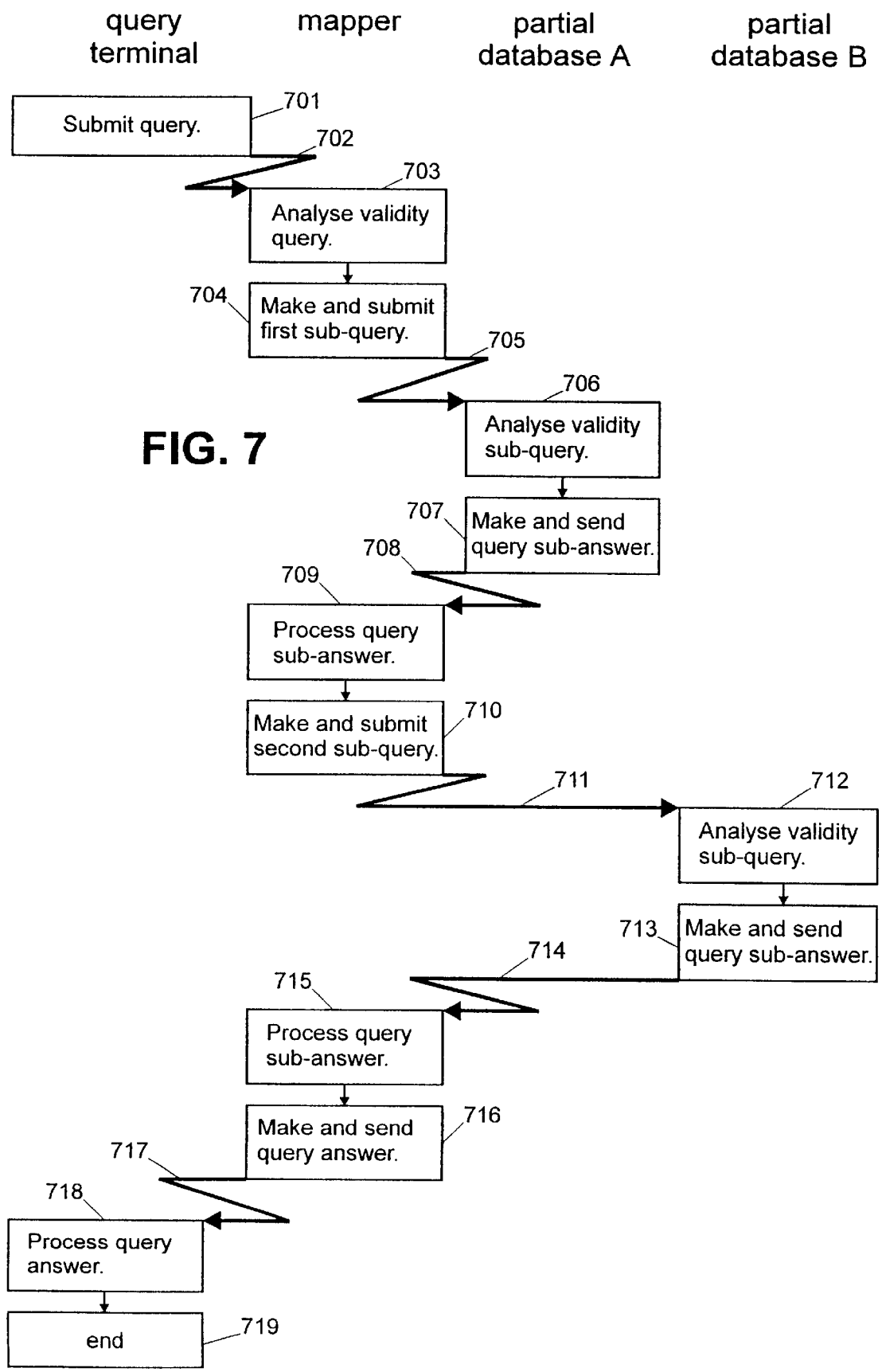

Turning to FIG. 7, we will now give an example of the query process as performed in the first preferred embodiment. It will be appreciated that the example was chosen so that it can be used by a person of ordinary skill in the art as the basis for generalization to other queries.

By applying a total of p add-record processes shown in FIG. 5, the update terminal has stored p records in the system. These records hold identifying information of a set of people. The records were fragmented in two parts. One fragment, holding the name information, is stored by partial-database 321. The other fragment, holding the address information, is stored by partial-database 322. Information regarding the fragmentation (who stores what type) is public. As a result of the add processes, the mapper has stored p data-elements 202, and the partial-database 321 and 322 each have stored p data-elements 400.

In FIG. 7 the process steps executed by the apparatuses involved in the example query are shown. The process starts with step 701. The query terminal first constructs the query request. We consider the following query template: "For person name=1: does the name occur in the address?". We assume that this query is expressed correctly in the query language used by all parties, as we do for all following queries. The template is accompanied by one query field, holding two values: the value "Smith" encrypted by the query terminal 331 for partial-database 321, and the same value ("Smith") encrypted by the query terminal 331 for partial-database 322. Next, the query template and query field are sent to the mapper 200, in message 702. Upon receipt of the message, the mapper starts execution of step 703. It analyses the validity of the query (for accordance with relevant query policy, agreements and legislation). In this example we assume that the query is allowed. The mapper continues with step 704 in which it constructs the first query sub-request. This request consist of a query template with value "Give the fragment identifier of name=1" and a query field, copied from the original query request, with value "Smith" encrypted for partial-database 321. It then sends this query sub-request to partial-database 321, in message 705. Upon receipt of this message the partial-database 321 starts the execution of step 706. It analyses the validity of the query sub-request. In this example we assume that the query sub-request is allowed. It continues with step 707 in which it constructs the query sub-answer. It decrypts the query field to reveal the value "Smith" and searches the set of locally-stored data-elements 400, until it finds a data-element with a field 401 that has the value "Smith". We assume that it finds such a data-element. From the field 402 of this data-element it copies the fragment-identifier, say $P'_x$, and sends it to the mapper 200 in message 708. Upon receipt of this message the mapper starts execution of step 709. It processes the query sub-answer, and stores the received fragment-identifier. Next it continues in step 710 by constructing a second query sub-request. This request consists of a query template with value "Give all fragment identifier of which name=1 occurs in address" and a query field, copied from the original query request, with value "Smith" encrypted for the partial-database 322. It then sends this query sub-request to partial-database 322, in message 711. Upon receipt of this message, the partial-database 322 starts the execution of step 712. It analyses the validity of query sub-request. In this example we assume that this query sub-request is allowed. It continues with step 713 in which it constructs the query sub-answer. It decrypts the query field to reveal the value "Smith" and searches the set of locally stored data-elements 400, until it finds a data-element that has a field 401 in which "Smith" occurs. We assume that it finds three of such data-element. From the field 402 of these data-elements it copies the fragment-identifiers, say $P'_1, P'_2$ and $P'_3$, and sends them to the mapper 200 in message 714. Upon receipt of this message the mapper 200 starts the execution of step 715. It processes the query sub-answer, and stores the received identifiers. It continues in step 716 by constructing the query answer. The mapper searches the locally-stored data-elements 202 for an occurrence of $P'_x$ and one of $P'_1, P'_2$ and $P'_3$ in the same fields 204. If an occurrence is found, it can be concluded that the answer to the query is "Yes", otherwise the answer is "No". The query-answer is sent to query terminal 331 in message 717, and the received fragment identifiers are discarded by the mapper. Upon receipt of this message the query terminal 331 starts execution of step 718, in which it processes the query-answer. Finally, the query process terminates in step 719.

In the above exposition of the example query some assumptions are made regarding validity of request and occurrences of data in the databases. The alternative flow of the process in cases where one or more of the assumptions are not met, will be obvious to a person of ordinary skill in the art.

As illustrated in the example given above, the mapper fully controls de-fragmentation of stored data. However, it may be noted that the data can be accessed in fragmented form, without involvement of the mapper. This is no threat to protection of sensitive information offered by the system, since the data fragmentation is chosen with this in mind (preventing each partial-database from holding sensitive data). Moreover, the information stored in a partial-database may be of value in providing statistical information.

3f. Changing Data Fragmentation

As will be appreciated the fragmentation of data can be altered, when stored according to the descriptions given above. If all involved parties (that operate partial-databases and mapper) cooperate, and only then, data can be retrieved from the system de-fragmented, and subsequently stored in non fragmented form or re-fragmented differently.

It will be clear to persons of ordinary skill in the art that each party operating a partial-database, by itself, can apply the present inventive techniques to further fragment the data stored at that party.

3g. Combining Database Systems

The inventive techniques described above can be applied when merging existing databases. When databases are merged, certain relations between records in the respective databases are identified. These identified relations can subsequently be used in queries in the new database; they form the surplus value of the merged database over the two individual databases. However, for legal reasons, reasons of security and privacy or other reasons it may not be allowed or desired to merge the databases into one database in a straightforward way. These restrictions can be overcome by distributing the access-control over multiple parties (i.e. introducing one or more mappers) and storing the fragmented data as proposed above. After the new database system is started and the desired fragmentation is decided, all data from both databases is stored unaltered, but fragmented, in the new system. Both databases perform the role of update terminal, and execute the above-described add-record process for all records. Secondly, data-fragments originating from the respective databases have to be linked according to one or more relations. Hereto the mapper of the new system initiates queries over the stored fragments regarding these relations, to which the partial-databases respond in a similar way as in the query-record process described above. The responses of the partial-databases are used by the mapper to store links between the corresponding fragment-identifiers. The process, (referred to as grouping of data-fragments), of performing certain fixed queries, by the mapper, prior to queries from the query terminal, will be described in detail below. To process query-requests submitted by the query parties of the new system, the mapper will use the links that resulted from the pre-queries when constructing query sub-requests and interpreting the query sub-answers.

It will also be appreciated that databases that are constructed using the present inventive techniques can only be totally merged when all involved partial-databases and the mapper agree to such a merge.

3h. Improvements And Extensions

To prove authenticity of messages and to allow disputes to be resolved, all messages may be supplied together with digital authentication (signatures). Additionally, a digital receipt may be supplied to the sender of a message by the receiving party. Digital signatures and receipts are well-known types of public key signatures well-known in the art.

In the description of the three processes above, the update, query and partial-databases apply encryption to hide data from the mapper. If no countermeasures are taken, encrypted data may be recognized when it passes a party. Although encrypted data cannot be read, recognizing occurrences of the same data can reveal information. Various methods to hide both the content, and the occurrence of data, are known in the literature, such as for example the addition of some varying, redundant information ('noise') to the data before encryption, in a way that allows removal of the noise after decryption.

Instead of sending data (encrypted) via the mapper, it may be preferable in some instances, for reasons of efficiency and security, to send the data (to be hidden) over an alternative channel directly to the recipient. When, additionally, the (encrypted) data in the data fields of the above-mentioned messages is replaced by placeholders, it is believed that the same functionality as described above can be achieved.

In the same way that mixes can be replaced by mix-cascades, the mapper 200 can be replaced by a mapper-cascade. FIG. 8 shows such a mapper-cascade. The box 800 represents two or more mappers 200. For clarity, only two are shown. Each mapper can communicate with its neighbors in the cascade. For clarity, only two communication channels are shown, 811 and 812. The communication channel 810 of the first mapper in the cascade corresponds to the communication channels 340,341,344 and 345 of the original (replaced) mapper. The communication channel 813 of the last mapper in the cascade correspond to the communication channels 342 and 343 of the original (replaced) mapper. The functionality of each of the mappers in the cascade is identical to the functionality the original (replaced) mapper 200 described above. It is envisioned that each mapper in a mapper-cascade is operated by a different trusted third party. The cascading of mappers allows the introduction of the desired number of data protecting parties. It will be obvious to a person of ordinary skill in the art how to extend the operations described above to a system that includes a mapper-cascade. To ensure that none of the mappers is by-passed, the data submitted by the update terminals may be encrypted successively for all respective mappers.

It will be appreciated that some efficiency improvements, obvious to those of ordinary skill in the art, can be applied. For instance, instead of sending all fragments from a single record in a single message, to identify records (when presented fragmented) record identifiers can be introduced. The correspondence between the fragment identifiers $P_x$ and $P'_x$ does not have to be stored, if the mapper constructs $P'_x$ from $P_x$ in a fixed, reproducible and reversible way.

4. Detailed Description Of The Second Preferred Embodiment

We continue with a detailed description of a second preferred embodiment of the inventive techniques, that builds on techniques described above. This embodiment is believed to be an efficient implementation of a special case of the first preferred embodiment, extended to offer additional functionality. We describe a dossier system in which dossiers on individuals are stored. In this example each dossier contains medical records relating to an individual, which are updated and used by various physicians and/or other doctors. It will be appreciated that the choice of a medical dossier-system is arbitrary. It is chosen to expose the present inventive techniques and should not be viewed as any limit of their scope. Other applications in which the inventive techniques can be applied are easily envisioned, such as systems that store dossiers holding information other than medical information, and systems that store dossiers on entities other than individuals, for example, but without limitation, groups of individuals, organizations or legal entities.

4a. Overview

Turning now to FIG. 9, a description of the respective entities and their interconnections in a proposed medical dossier-system is given.

The entities that supply, refresh and use information stored in dossiers are referred to as local terminals. Box 900 represents one or more local terminals. The number of local terminals is denoted n. Only two are shown for illustrative purposes, numbered 901 and 902. Each local terminal fulfills a role corresponding to both an update terminal 300 and a query terminal 330 (see FIG. 3).

Data access is controlled jointly by three entities. The functionality of each of these entities will be clear from the descriptions of various processes given below. The first entity 910 is referred to as mapper A, the second entity 920 is referred to as mapper B, and the entity 940 is referred to as the grouper. As will be clear from the exposition below, their joint functionality can be seen as an extension to the functionality of the mapper 200. It is envisioned that these three entities are operated by one or more trusted third parties.

In this second preferred embodiment, the stored information is again fragmented vertically. The system comprises two partial-databases, each with a distinct functionality. The first partial-database 930 (the matcher) holds individuals' identifying information (the part of a medical record that refers to the real-life identity of an individual), the other partial-database 950 (the central-database) holds only medical information (the actual medical data without reference to real-life identities). The functionality of these entities corresponds to functionality of the partial-databases 320 of FIG. 3.

Each of the n local terminals 900 can exchange messages directly with the grouper 940. For clarity, only the communication channels for local terminals 1 and n are shown, numbered 993 and 994. Mapper A 910 can exchange messages directly with matcher 930 using communication channel 981, and with grouper 940 using communication channel 984. Mapper B 920 can exchange messages directly with grouper 940 using communication channel 983, and with the central-database 950 using communication channel 982. When requested, all apparatuses will forward messages to enable apparatuses that are not directly connected to exchange information.

Figure 11:
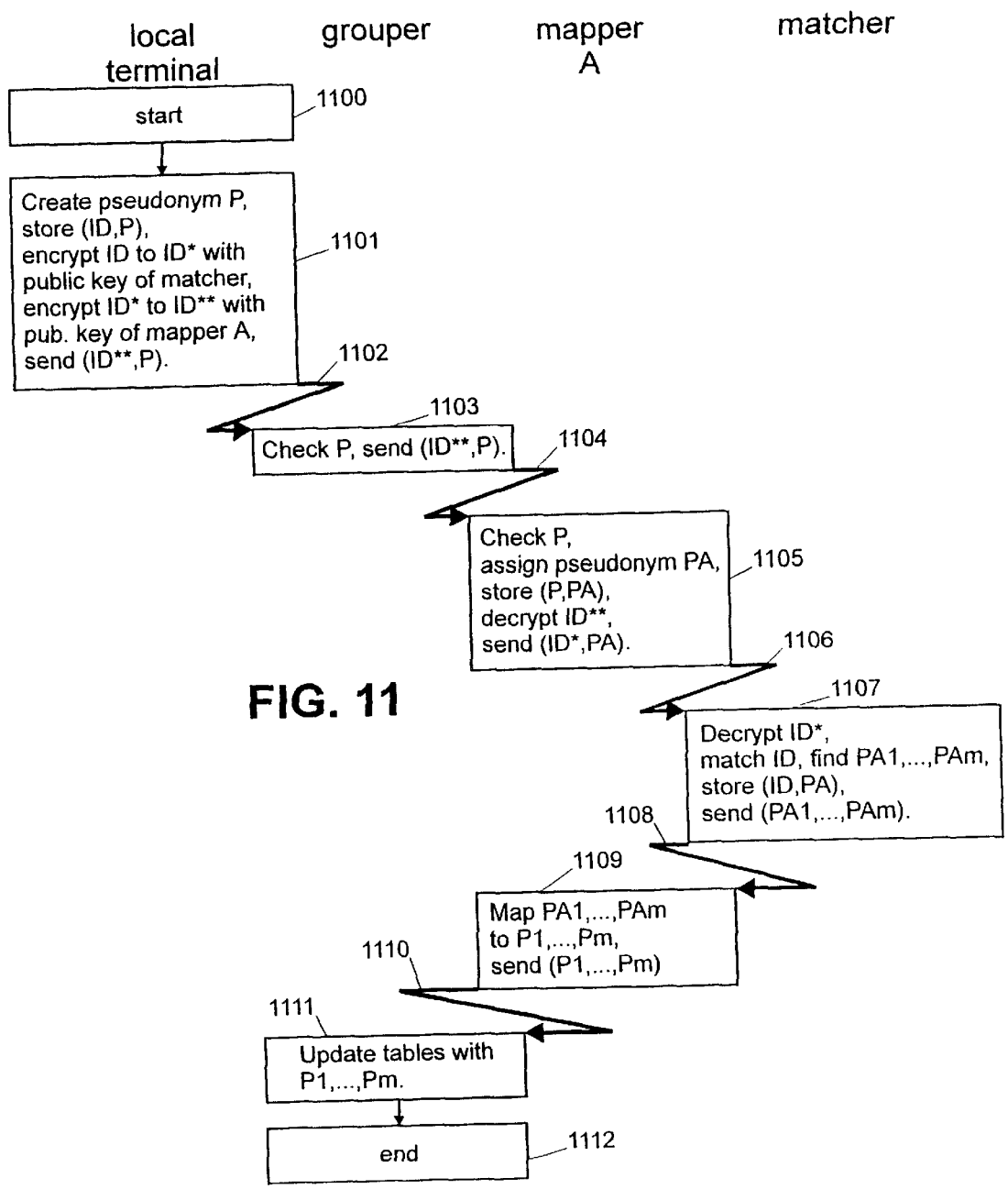
FIG. 11 shows a flowchart of a preferred embodiment of a link-dossier operation in accordance with the teachings of the present invention, involving actions by a local terminal, a grouper, a mapper A and a matcher (all of FIG. 9), which is believed to link an individual to his/her dossier stored in the system and supply the local terminal with a pseudonym for this individual that is used to refer to his/her dossier in subsequent update-dossier operations of FIG. 12 and query-dossier operations of FIG. 13.
Figure 13:
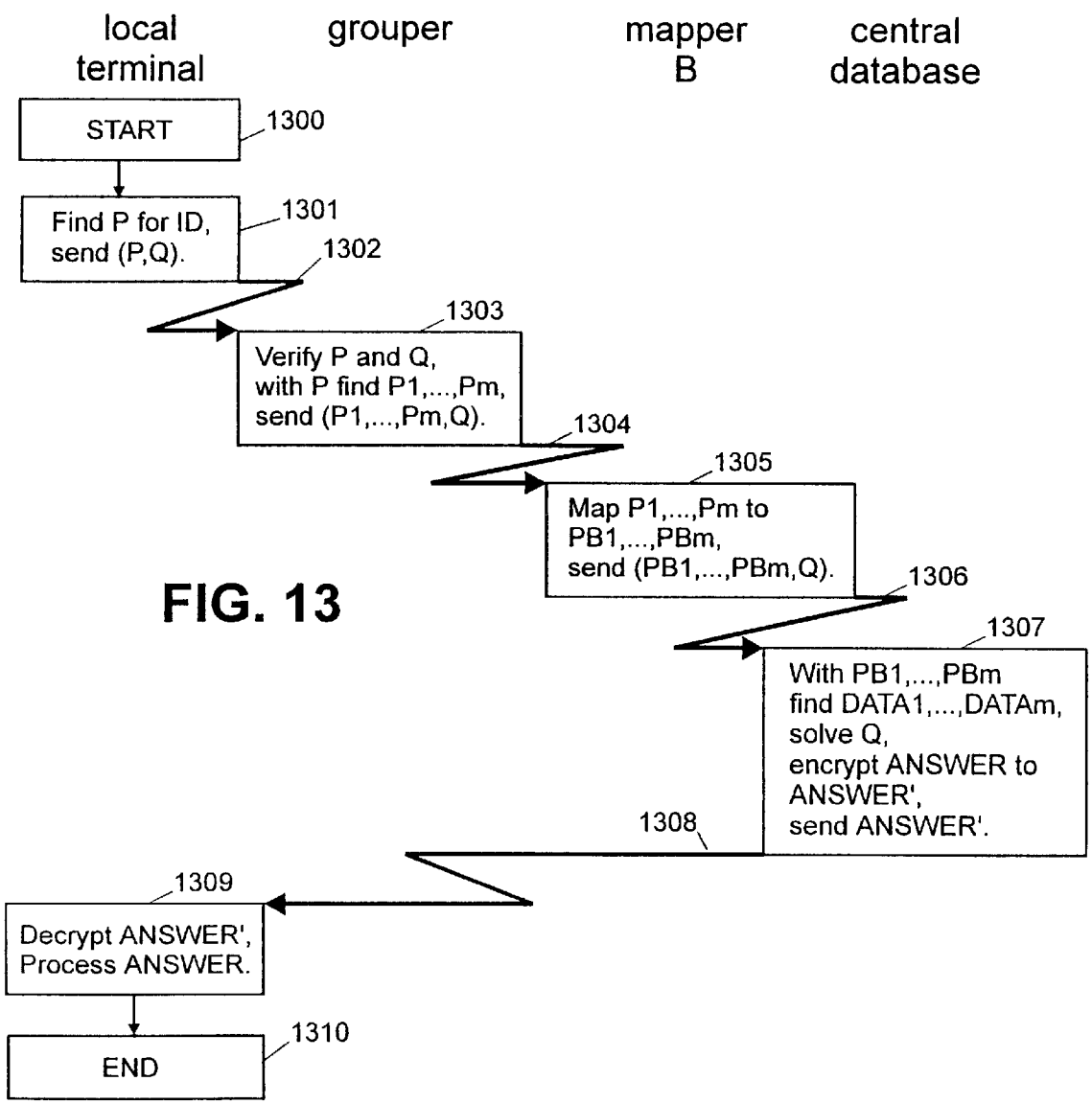
FIG. 13 shows a flowchart of a preferred embodiment of a query-dossier operation in accordance with the teachings of the present invention, involving actions by a local terminal, a grouper, a mapper B and a central-database (all of FIG. 9), which is believed to retrieve data relating to an individual from his/her dossier using a pseudonym for this individual (obtained by means of a link-dossier operation of FIG. 11) to refer to this dossier.
Figure 14:
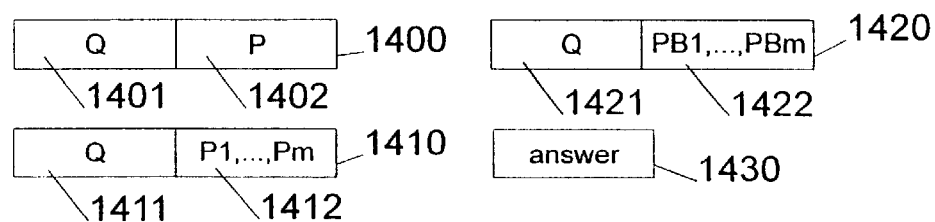
FIG. 14 is a block diagram showing data-objects constructed, sent, received, processed, and/or stored by the apparatuses of FIG. 9 in the query-dossier operation of FIG. 13, in accordance with the teachings of the present invention.

Three basic operations are supported: link-dossier, update-dossier and query-dossier, shown in FIG. 11, FIG. 12 and FIG. 13 respectively. FIG. 10 shows the data-objects related to the link-dossier and update-dossier operations. FIG. 14 shows the data-objects related to the query-dossier operation.

As already mentioned in relation to the first preferred embodiment, depending on the application of the invention and on the jurisdictional domain in which it is operated, certain legal restrictions may apply to the operations and/or results thereof. Additional restrictions may be laid down in agreements between the local terminals, the grouper, the mapper A, the mapper B, the matcher and the central-database.

4b. The Link-Dossier Operation

The local terminal has to perform the link-dossier operation for a certain individual before it can perform any other operation regarding that individual.

Turning to FIG. 11, the link-dossier operation is described in detail. When a local terminal wants to create a link to the dossier of a certain individual, it starts the process at 1100. We assume that this local terminal obtained identifying information from the individual beforehand. Prior to this operation, agreements have been made within the system that define the form of acceptable identifying information. This identifying information consist of, but is not limited to: for example the name, the address, the date of birth, the place of birth and/or the social security number of the individual. We will refer to the obtained identifying information as ID.

In step 1101, the local terminal assigns to ID a new, unique, identifier which we will refer to as pseudonym P. This pseudonym should be chosen so it cannot be linked to the identity by anything other than the local terminal. In this respect, for instance, a previously unused, randomly generated integer can be used. The local terminal constructs a data-object consisting of two fields, from now on referred to as a tuple, that has a structure shown in 1001. The field 1002 is assigned the value ID and the field 1003 is assigned the value P. It then stores this tuple. Next the local terminal constructs a data-object that has a structure shown in 1010.

The field 1012 is assigned the value P. The field 1011 of this tuple is assigned the value ID, a doubly encrypted version of ID. The value ID is created as follows. To hide it for the grouper and mapper A ID is encrypted with the encryption key of the matcher. To ensure that mapper A is not by-passed, the result ID* is encrypted again, this time with the encryption key of the mapper A, resulting in ID. Finally, this tuple 1010 is sent to the grouper in message 1102**.

Before the current link-dossier operation started, the grouper will have stored a set of zero or more data-objects. These data-objects are of a structure shown in 1050. This is a set holding one or more pseudonyms previously accepted from one of the local terminals. For clarity, two pseudonyms are shown, 1051 and 1053. Field 1052 represents the remaining pseudonyms. Upon receipt of the message 1102 the grouper executes step 1103. It checks if the pseudonym P, taken from field 1012 of the received tuple 1010, is a new pseudonym, unique to the grouper, by verifying if it does not occur in any of the stored sets 1050. If it does occur, the operation is aborted. Otherwise, the grouper forwards the tuple 1010 to mapper A, in message 1104.

Before the current link-dossier operation started, the mapper A will have stored a set of zero or more data-objects of a structure shown in 1020. The field 1021 holds a pseudonym previously accepted from one of the local terminals. The field 1022 holds a pseudonym previously assigned by mapper A. Upon receipt of message 1104 the mapper A executes step 1105. It checks whether the pseudonym P, taken from field 1012 of the received tuple 1010, is a new pseudonym, unique to mapper A, by verifying that it does not occur in any field 1021 of all tuples 1020 stored by the mapper A. If it does occur, the operation is aborted. Otherwise, mapper A generates a new, unique pseudonym PA. Similar to the creation of pseudonym P this pseudonym should be chosen so that it cannot be linked to the identity by anything other than the mapper A. This pseudonym is linked to the received P by creating and storing a data-object 1020. The field 1021 is assigned the value P, and the field 1022 is assigned the value PA. Next, mapper A constructs a data-object of a structure shown in 1030. The field 1031 is assigned the value ID*, which mapper A re-creates from the received tuple 1010 by decrypting the value ID of field 1011. Field 1032 is assigned the value PA. Finally, mapper A sends the tuple 1030 to the matcher in message 1106**.

Before the current link-dossier operation started, the matcher has stored zero or more data-objects. These data-objects are sets of a structure shown in 1040. Each set 1040 contains zero or more tuples. Two of these tuples, 1041 and 1043, are shown for clarity. The remaining tuples are denoted by 1042. Each tuple has a structure shown in 1046, consisting of a field 1045 holding a pseudonym previously accepted from the mapper A, and a field 1044 holding corresponding identifying information previously received from one of the local terminals (via the mapper A). Upon receipt of message 1106 the matcher executes step 1107. It verifies if PA (taken from field 1032 of the received tuple 1030) is a new pseudonym, unique to the matcher, by checking if it does or does not occur in any of the pseudonym fields 1045 of all the tuples 1046 of all sets 1040 stored by the matcher. If it does occur, the operation is aborted. Otherwise, the matcher re-creates ID from message 1106, by decrypting ID* taken from field 1031 of the received tuple 1030. Next, for all stored sets 1040 the matcher compares the retrieved ID with the values of all the identifying information fields 1044 of all tuples 1046 of that set. If ID matches with a set of identifying information fields 1044, a tuple 1046 is added to that set. The identifying information field 1044 of this added tuple is assigned the value ID, and the pseudonym field 1045 is assigned the value PA. Otherwise, if ID does not match with any of the sets 1040, a new set 1040 is created, holding one tuple 1046 of which the identifying information field 1044 is assigned the value ID, and the pseudonym field 1045 is assigned the value PA. (It may be noted that identifying information does not have to be equal to match. The definition of a 'match' falls outside the scope of the present invention. Many matching techniques that can be automated are known in the literature. It is envisioned that for some applications manual matching may be needed in ambiguous situations.) Next, the matcher constructs a data-object of a structure shown in 1060. This is a set that holds one or more pseudonyms. For clarity, two fields are shown, 1061 and 1063. The remaining fields are denoted by 1062. The set 1060 is constructed by copying all the pseudonyms stored in the fields 1045 of all tuples 1046 into the set 1040 that contains ID. After it is constructed, set 1060 consists of m pseudonyms, denoted by PA1, . . . ,PAm, all relating to ID. Finally, the matcher sends set 1060 to mapper A, in message 1108.

Upon receipt of this message the mapper A executes step 1109. It constructs a data-object of a structure shown in 1070. This is a set that holds one or more pseudonyms. For clarity two fields are shown, 1071 and 1073. The remaining fields are denoted by 1072. The set 1070, that is initially empty, is constructed as follows. For each of the pseudonyms PA1, . . . ,PAm (from the received set 1060) the mapper A searches all stored tuples 1020. When it finds a tuple 1020 that holds the searched pseudonym in field 1022, it adds to set 1070 the pseudonym held in the field 1021 of this tuple. This search will result in a set 1070 holding m pseudonyms, denoted by P1, . . . ,Pm. Finally, this set 1070 is sent to the grouper in message 1110.

Upon receipt of this message the grouper executes step 1111. The grouper updates its set of data-objects 1050. If pseudonym P is the only element in the received set 1070, a new set 1050 is created and stored, with one field that is assigned the value P. Otherwise, if P is not the only element in the received set 1070, the grouper searches the stored sets 1050 for a set of pseudonyms that matches the set P1, . . . , Pm, except for P. It is assumed that this set is always found in this case. This set is then replaced by a set P1, . . . ,Pm, which includes the new pseudonym P.

Step 1112 ends the operation of the link-dossier operation.

With the operation described above, the local terminal that initiated the operation has created a link to the dossier stored in the system of the individual described by ID. The pseudonym P is the handle of this link. As will be clear from the detailed descriptions of the update-dossier and query-dossier operations below, updates of medical data regarding the individual, submitted to the system by the local terminal using the pseudonym P will subsequently be available to all local terminals, barring applying regulations. Also, in subsequent query-dossier operations regarding the individual submitted to the system by the local terminal using the pseudonym P, all medical data regarding the individual submitted to the system by all local terminals will be available to the local terminal, barring applying regulations.

It may be noted that an individual cannot be expected to give exactly the same ID on different occasions, for various reasons, including the fact that an ID is expected to change over time. Matching techniques are available, and well-known in the art, that are powerful enough to match various identifications of the same individual to each other, and to not match various identifications of different individuals to each other, both with a high degree of precision. Using these matching techniques, it is believed that multiple executions of the above described link-dossier operation regarding the same individual will result in linking to the same dossier, and that multiple executions of the above-described link-dossier operation regarding different individuals will not result in linking to the same dossier, both with an equally high degree of precision.

4c. The Update-Dossier Operation

For a local terminal to be able to execute an update-dossier operation regarding an individual, it first must have performed the link-dossier operation, shown in FIG. 11, regarding this individual.

Turning now to FIG. 12, the update-dossier operation will be described. This operation comprises updating the central-database by a local terminal by adding medical data to an individual's dossier. It will be appreciated that in many applications other update operations will be supported by the central-database as well (changing, merging and/or removing of data). It is believed that all types of update-operations can be performed in a way similar to the mechanism given below.

The process starts at step 1200, executed by the local terminal. It is assumed that this local terminal has obtained the right real-life identity ID of the individual, and that it wants to update this individual's medical dossier with information to which we will refer to as DATA. In step 1201 the local terminal searches the stored tuples 1001 to find the pseudonym P corresponding to ID. If a link-dossier operation has been performed previously for that ID, such P is normally found among the stored tuples. To hide it from the grouper and mapper, the local terminal encrypts DATA with the encryption key of the central-database. To ensure that mapper B is not by-passed in the update-dossier operation, the result of this encryption, DATA*, is encrypted again, this time with the encryption key of mapper B, resulting in DATA. Next, the local terminal constructs a data-object of a structure shown in 1075. Field 1076 of this tuple is assigned value DATA, and field 1077 is assigned the value P. Finally, the local terminal sends the tuple 1075 to the grouper 940 in message 1202.

Upon receipt of this message the grouper executes step 1203. It first verifies if P is an allowed pseudonym, by searching all stored sets 1050 for an occurrence of P. If a link-dossier operation has been performed previously for this ID, such P is normally found in the stored tuples. If no occurrence is found, the operation is aborted. Otherwise, the grouper forwards the message containing the tuple 1075 to mapper B in message 1204. It will be clear from the exposition below, that in update operations that affect data already stored in the dossier, the grouper will concatenate to the tuple 1075 (part of) the set of pseudonyms related to P, that is, (part of) the set of pseudonyms stored in the set 1050 that contains P. This extension, as will be obvious to a person of ordinary skill in the art, allows all common types of updates to a dossier.

Before execution of the update-dossier operation the mapper B will have stored a set of zero or more data-objects of a structure shown in 1080. The fields 1081 of these tuples contain pseudonyms previously received from the grouper. The fields 1082 of these tuples contain corresponding pseudonyms previously assigned by the mapper B. Upon receipt of the message 1204 the mapper B executes step 1205. It first verifies if the pseudonym P, received in message 1204, has been previously received, by searching the fields 1081 of all stored tuples 1080. If it finds a tuple with an occurrence of P, it reads the corresponding pseudonym PB from the field 1082. Otherwise, it creates and store a tuple 1080 of which the field 1081 is assigned the value P, and the field 1082 is assigned a new pseudonym PB, unique to mapper B. Similar to the creation of pseudonym P this pseudonym should be chosen so it cannot be linked to the identity by anything other than the mapper B. Next, it constructs a tuple of a structure shown in 1085. It assigns the pseudonym PB to field 1087. It then decrypts DATA, from the received tuple 1075**, and assigns the result DATA* to field 1086. Finally, it sends tuple 1085 to the central-database in message 1206.

Before execution of the update-dossier operation the central-database will have stored a set of zero or more data-objects of a structure shown in 1090. The field 1092 of this tuple contains a pseudonym previously received from the mapper B. The field 1091 of this tuple contains medical data, corresponding to the pseudonym, received during an update-dossier operations previously performed by a local terminal. Upon receipt of the message 1206, the central-database executes step 1207. It retrieves DATA by decrypting DATA*, received in tuple 1085. It then verifies if the pseudonym PB, received in message 1206, has been previously received, by searching the fields 1092 of all stored tuples 1090. If it finds a tuple with an occurrence of PB, it will add DATA to the corresponding medical data stored in the field 1091 of this tuple. Otherwise, it will construct and store a new tuple 1090, and assign the value PB to the field 1092, and the value DATA to the field 1091.

This ends the update-dossier operation (see 1208).

It will be appreciated that the medical data is stored at the central-database linked to a pseudonym, and that a patient will have a different pseudonym at each physician. As a result this database has a degree of horizontal fragmentation.

4d. The Query-Dossier Operation

For a local terminal to be able to execute a query-dossier operation regarding an individual, it must first have performed the link-dossier operation, shown in FIG. 11, regarding this individual.

Turning now to FIGS. 13 and 14, the query-dossier operation is described. This operation comprises querying of an individual's medical dossier, by one of the local terminals, a medical dossier regarding an individual.

The process starts at step 1300, executed by the local terminal. It is assumed that this local terminal has obtained the real-life identity ID of the individual. The local terminal queries this individual's medical dossier by submitting a query-request to the grouper. This query-request consist of a query template and zero or more query fields. For brevity we omit these details here, and refer to the description given in relation to FIG. 7. During the query-dossier operation, the query template and respective query fields are handled in a way similar to the process described in relation to FIG. 7. The query-request is referred to as Q. In step 1301 the local terminal searches the stored tuples 1001 to find the pseudonym P corresponding to ID. If a link-dossier operation has been performed previously for that ID, such P is normally found in the stored tuples. Next, the local terminal constructs a data-object of a structure shown in 1400, and assigns the value Q to field 1401, and the value P to field 1402. (Not shown here for clarity is the hiding for the grouper and mapper of the data in the query-fields. A description of the hiding mechanism has already been given above in relation to FIG. 7.) Finally, the local terminal sends the tuple 1400 to the grouper, in message 1302.

Upon receipt of this message the grouper starts execution of step 1303. It first verifies if P is an existing pseudonym, by searching all stored sets 1050 for an occurrence of P. If one of more link-dossier operations have been performed previously for ID, one such P is normally found in the stored tuples. If no occurrence is found, the operation is aborted. Otherwise, the grouper starts analyzing the query. It first verifies the validity of the query, in a fashion similar to that described in relation to FIG. 7. It will be appreciated that, as a result of the above described link-dossier and update-dossier operations, each of the pseudonyms stored in the set 1050 that contains P corresponds to a part of the dossier on individual ID stored in the central-database by the local terminals. Based on, (among other things), which local terminal stored a part of a dossier and the type of that part, the grouper determines which parts of the dossier are relevant to the submitted query-request. It is believed that a large class of queries can be analyzed this way by the grouper. The grouper constructs a data-object of a structure shown in 1410, and assigns the value Q to the field 1411. We assume that there are m relevant parts, and refer to the corresponding pseudonyms as P1, . . . ,Pm. Field 1412 is assigned this set. Finally, the tuple 1410 is sent to mapper B in message 1304.

Upon receipt of this message the mapper B executes step 1305. We assume that it accepts all submitted query-requests. Alternatively, it can perform a validity check on the query-request as described in relation to FIG. 7. The mapper B constructs a data-object of a structure shown in 1420, and assigns the query-request Q to the field 1421. It constructs an, initially empty, set of pseudonyms by replacing all pseudonyms from the field 1412 of the received tuple 1410 with the corresponding pseudonyms. For each of P1, . . . , Pm, it searches the fields 1081 of the set of stored tuples 1080. If an occurrence of a pseudonym in a field 1081 is found, the mapper B adds the corresponding pseudonym, read from the field 1082, to the set in construction. This results in a set of m pseudonyms, referred to as PB1, . . . , PBm. This set is assigned to the field 1422 of tuple 1420. Finally, it sends the tuple 1420 to the central-database, in message 1306.

Upon receipt of this message the central-database executes step 1307. The central-database searches in the set of stored tuples 1090, to find the tuples 1090 that have as value in the field 1092, one of the pseudonyms PB1, . . . , PBm, received in message 1306. The medical data stored in the fields 1091 of these tuples is used to construct a query-answer to the query-request Q, received in message 1306. A data-object of a structure shown in 1430 is constructed to hold the query-answer. To hide the content of the query-answer for the mapper B and the grouper, it is encrypted for the local terminal, and the result is assigned to 1430. Finally, the central-database sends 1430 to the mapper B, who forwards it to the grouper, who forwards it to the local terminal. This message flow is depicted by 1308.

Upon receipt of the message 1308 the local terminal executes step 1309. It decrypts the query-answer, and processes it.

Step 1310 ends the query-dossier operation.

As will be clear from the description of the query-dossier operation given above, the matcher is not involved in the process. Considering that the matcher is the only entity other than the local terminal that contains identifying information, no party other than the party operating the local terminal knows the identity of the person whose dossier is queried. The information which local terminals may accumulate regarding query frequencies is limited to the queries which they submit. It is believed that, unless multiple parties collude, no party accumulates information regarding the query frequency related to an individual.

4e. Security

Since it is the object of the presented system to store records fragmented, and subsequently control de-fragmentation, the system can be considered successfully attacked when part of the records are de-fragmented without appropriate authorization. Two types of attacks against the system are envisioned.

In a static attack (part of) the stored data is used by one or more parties outside the system and/or some colluding parties within the system. Since the problem of protecting (physically or logically) a single database against unauthorized access is not particular to the present invention we will not discuss it here. However, it is believed to be more difficult to gain unauthorized access to all data in a database when the data is divided over multiple (physically or logically) different partial-databases, as in the present invention. In the case that information from the grouper or one of the mappers is not available, no data can be de-fragmented at all. It is believed that by selecting a specific number of trusted third parties to run the grouper and mappers any desired degree of protection against static attacks can be achieved.

In a dynamic attack an adversary tries to gain information by observing or modifying the operations performed by the apparatuses of the system. However, the apparatuses of the involved parties are considered to be protected against abuse, and messages between various apparatuses are encrypted to shield their content from eavesdroppers, leaving only the observation of message-activity between various parties to the adversary. The above-referenced paper by Chaum, describes counter measures against such observations (referred to as traffic analyses). These measures include processing messages in batches and introducing dummy messages. It will be obvious to persons with ordinary skill in the art, how to modify the operations described above (link-dossier, update-dossier and query-dossier operations) to include these protection mechanisms.

4f. Improvements And Extensions

In addition to the improvements and extensions already mentioned in relation to the first preferred embodiment and security issues, the following improvements and extensions are envisioned.

By regarding the mapper B 920 as both an update terminal (300, see FIG. 3) and query terminal (330, see FIG. 3), the mechanisms disclosed in the description of the first preferred embodiment can be applied to the central-database 950 of the second preferred embodiment, resulting in vertically fragmented storage of the medical data.

As will be appreciated, if a local terminal wants to use a new pseudonym for a certain individual known already to that local terminal under a different pseudonym, the local terminal may execute another link-dossier operation as described above with the new pseudonym. All future accesses by the local terminal to the medical dossier of this person can be done using either the old or the new pseudonym. By using more pseudonyms for an individual, the horizontal fragmentation of the central-database is enhanced. In principle, every update of the central-database could be done using a new pseudonym, thereby achieving a maximum degree of horizontal fragmentation.

Furthermore, the grouper may create a 'super-pseudonym' for each set 1050 of corresponding pseudonyms. As a consequence, each access to the central-database requires only that a single pseudonym is communicated from the grouper to the central-database through the mapper B, instead of a list of pseudonyms. Although this increases efficiency, this is believed to destroy the horizontal fragmentation in the central-database.

In certain applications it may be acceptable to remove one of the mappers, mapper A or mapper B. If both mappers are removed, no third party would be able to prevent the matcher and central-database from de-fragmenting the stored data (link the identifying information to the medical records). It is believed that removal of mapper A, and the corresponding changes obviously required in the operations described above, will not affect the described functionality and features of a system constructed in accordance with the present inventive techniques, except in the case of a collusion between the grouper and the matcher, in which the query frequency relating to an individual may be revealed. Similarly, it is also believed that removal of mapper B, and the corresponding obvious changes required in the described operations need not affect the described functionality and features of a system constructed in accordance with the present inventive techniques, except in the case of collusion between the grouper and the central-database, in which circumstances existing horizontal fragmentation in the central-database may be removed.

While these descriptions of the present invention have been given as examples, it will be appreciated by those of ordinary skill in the art that various modifications, alternate configurations and equivalents may be employed without departing from the spirit and scope of the present invention.

What is claimed is:

1. A method for transforming an input data object to an output data object, involving a sender, a mapper and a receiver, while hiding from the said receiver the correspondence between the said input data object and the said output data object, the method comprising the steps of:

the said sender sending a first message to the mapper, the said first message containing the input data object consisting of a first piece of data and a second piece of data and a third piece of data, the said second piece of data identifying the first piece of data and the said third piece of data identifying the said receiver;

the said mapper responding to the said first message by constructing the said output object consisting of a fourth piece of data and a fifth piece of data, the said fourth piece of data being constructed by applying a first transformation method to the said first piece of data so that the said fourth piece of data and the said first piece of data are substantially uncorrelated, and the said fifth piece of data identifying the said fourth piece of data and being constructed by applying a second transformation method to the said second piece of data so that the said fifih piece of data and the said second piece of data are substantially uncorrelated, the said mapper sending the said output object in a second message to the receiver identified in the said third piece of data; and the said receiver responding to the said second message by accepting it.

2. In the method of claim 1, the mapper furthermore retaining the correspondence between the said input data object and the said output data object.

3. In the method of claim 1, the said sender furthermore constructing the said first piece of data by applying a third transformation method to a sixth piece of data so that the said first piece of data and the said sixth piece of data are substantially uncorrelated, the said first transformation method reversing the said third transformation method.

4. In the method of claim 3, the said sender furthermore padding the said sixth piece of data with a first piece of piece of random data before the said third transformation method and the said mapper removing the said first piece of piece of random data after the said first transformation method.

5. In the method of claim 3, the said first transformation method being only known to the said mapper.

6. In the method of claim 5, the said third transformation method being public key encryption with a first public cryptographic key of the said mapper and the said first transformation method being public-key decryption with a first secret cryptographic key of the said mapper, corresponding to the said first public cryptographic key.

7. In the method of claim 3, the said sender furthermore constructing the said sixth piece of data by applying a fourth transformation method to a seventh piece of data so that the said sixth piece of data and the said seventh piece of data are substantially uncorrelated; and the said receiver constructing an eighth piece of data by applying a fifth transformation method to the said fourth piece of data, the said fifth transformation method reversing the said fourth transformation method.

8. In the method of claim 7, the said sender furthermore padding the said seventh piece of data with a second piece of piece of random data before the said fourth transformation method and the said receiver removing the said second piece of piece of random data after the said fifth transformation method.

9. In the method of claim 7, the said fifth transformation method being only known to the said receiver.

10. In the method of claim 9, the said fourth transformation method being public key encryption with a second public cryptographic key of the said receiver and the said fifth transformation method being public-key decryption with a second secret cryptographic key of the said receiver, corresponding to the said second public cryptographic key.

11. In the method of claim 7, furthermore hiding from the sender the correspondence between the said input data object and the said output data object by:

the said mapper constructing the said fourth piece of data by first applying the said first transformation to the said first piece of data and secondly applying a sixth transformation method to the result of the said first transformation method; and the said receiver constructing the said eighth piece of data by first applying a seventh transformation method to the said fourth piece of data and secondly applying the said fifth transformation method to the result of the said seventh transformation method, and the said seventh transformation method reversing the said sixth transformation method.

12. In the method of claim 11, the said mapper furthermore padding the said input of the said sixth transformation method with a third piece of piece of random data and the said receiver removing the said third piece of piece of random data from the said output of the said seventh transformation method.

13. In the method of claim 11, the said seventh transformation method being only known to the said receiver.

14. In the method of claim 11, the said sixth transformation method being public key encryption with a third public cryptographic key of the said receiver and the said seventh transformation method being public-key decryption with a third secret cryptographic key of the said receiver, corresponding to the said third public cryptographic key.

15. In the method of claim 1, the mapper furthermore hiding from the said receiver the correspondence between the said input data object and the said output data object by sending the said second messages in batches, aggregated from processing a substantial number of the said input data objects.

16. A method for transforming an input data object to a set of output data objects, involving a sender, a mapper and a set of receivers, while hiding from each of the said receivers the correspondence between the input data object and each of the output data objects and between the output objects mutually, the method comprising the steps of:

the said sender sending a first message to the mapper, the first message containing the input data object consisting of a first set of data-elements, each data-element of the said first set consisting of a first piece of data and a second piece of data and a third piece of data, the said second piece of data identifying the first piece of data and the said third piece of data identifying one of the said receivers;

the said mapper responding to the said first message by constructing a second set of data-elements, the said second set having the same cardinality as the said first set, each data-element of the said second set being based on a different data-element of the said first set and each data-element of the said second set consisting of a fourth piece of data and a fifth piece of data, the said fourth piece of data being constructed by applying a first transformation method to the said first piece of data of the said data-element of the said first set so that the said fourth piece of data and the said first piece of data are substantially uncorrelated, and the said fifth piece of data identifying the said fourth piece of data and being constructed by applying a second transformation method to the said second piece of data of the said data-element of the said first set so that the said fifth piece of data and the said second piece of data are substantially uncorrelated;

the said mapper sending each data-element of the said second set in a second message to the receiver identified in the said third piece of data of the said related data-element of the said first set; and every receiver responding to the said second message by accepting it.

17. In the method of claim 16, the mapper furthermore retaining the correspondence between the said input data object and the said output data objects.

18. In the method of claim 16, the mapper furthermore retaining the correspondence between the said output data objects.

19. In the method of claim 16, the said sender furthermore constructing the said first piece of data by applying a third transformation method to a sixth piece of data so that the said first piece of data and the said sixth piece of data are substantially uncorrelated, the said first transformation method reversing the said third transformation method.

20. In the method of claim 19, the said sender furthermore padding the said sixth piece of data with a first piece of random data before the said third transformation method and the said mapper removing the said first piece of random data after the said first transformation method.

21. In the method of claim 19, the said first transformation method being only known to the said mapper.

22. In the method of claim 21, the said third transformation method being public key encryption with a first public cryptographic key of the said mapper and the said first transformation method being public-key decryption with a first secret cryptographic key of the said mapper, corresponding to the said first public cryptographic key.

23. In the method of claim 19, the said sender furthermore constructing the said sixth piece of data by applying a fourth transformation method to a seventh piece of data so that the said sixth piece of data and the said seventh piece of data are substantially uncorrelated; and the said receiver constructing an eighth piece of data by applying a fifth transformation method to the said fourth piece of data, the said fifth transformation method reversing the said fourth transformation method.

24. In the method of claim 23, the said sender furthermore padding the said seventh piece of data with a second piece of random data before the said fourth transformation method and the said receiver removing the said second piece of random data after the said fifth transformation method.

25. In the method of claim 23, the said fifth transformation method being only known to the said receiver.

26. In the method of claim 25, the said fourth transformation method being public key encryption with a second public cryptographic key of the said receiver and the said fifth transformation method being public-key decryption with a second secret cryptographic key of the said receiver, corresponding to the said second public cryptographic key.

27. In the method of claim 16, the mapper furthermore hiding from all parties except for the parties operating the said sender and the said mapper the correspondence between the said input data object and the said output data objects and between the said output data objects mutually by sending the said second messages in batches, aggregated from processing a substantial number of the said input data objects.

28. A method for storing an information record partitioned, involving update terminals, a mapper and partial-databases; updating the said stored information record, involving the said update terminals, the said mapper and the said partial-databases; and querying multiple of the said stored information records, involving query terminals and the said partial-databases, and being controlled by the said mapper;

the storing of an information record comprising steps of:

one of the said update terminals dividing the said information record into parts and constructing a first set of data-elements, the type of information record to be stored and the applied division being known to all parties, and each data-element of the said first set consisting of a first piece of data and a second piece of data and a third piece of data, the said first piece of data being constructed by applying a first transformation method to one of the said parts so that the said first piece of data and the said part are substantially uncorrelated, the said second piece of data identifying the said part and the said third piece of data identifying one of the said group of partial-databases;

the said update terminal sending the said first set in a first message to the said mapper;

the said mapper responding to the said first message by constructing a second set of data-elements, the second set having the same cardinality as the first set, each data-element of the said second set being based on a different data-element of the said first set and each data-element of the said second set consisting of a fourth piece of data and a fifth piece of data, the said fourth piece of data being constructed by applying a second transformation method to the said first piece of data of the said data-element of the said first set, the said second transformation method being only known to the said mapper and reversing the said first transformation method, and the said fifth piece of data identifying the said fourth piece of data and being constructed by applying a third transformation method to the said second piece of data of the said data-element of the said first set so that the said fifth piece of data and the said second piece of data are substantially uncorrelated, the said third transformation method being only known to the said mapper;

the said mapper storing the correspondence between all the said second piece of data of the said first set;

the said mapper sending each data-element of the said second set in a second message to the partial-database identified in the said third piece of data of the said related data-element of the said first set; and each of the said partial-databases responding to the said second message by accepting it and storing the said data-element; and the updating of a stored information record comprising steps of:

one of the said update terminals dividing the said update information into update parts corresponding to the division of parts being performed during the storing of the said information record and constructing a third set of data-elements, each data-element of the said third set consisting of a sixth piece of data and a second piece of data and a third piece of data, the said sixth piece of data being constructed by applying the said first transformation method to one of the said update parts so that the said sixth piece of data and the said update part are substantially uncorrelated, the said second piece of data identifying the said part to be updated and the said third piece of data identifying the partial-databases where the part to be updated is stored;

the said update terminal sending the said third set in a third message to the said mapper;

the said mapper responding to the said third message by constructing a fourth set of data-elements, the fourth set having the same cardinality as the third set, each data-element of the said fourth set being based on a different data-element of the said third set and each data-element of the said fourth set consisting of a seventh piece of data and a fifth piece of data, the said seventh piece of data being constructed by applying the said second transformation method to the said sixth piece of data of the said data-element of the said third set, and the said fifth piece of data identifying the said fourth piece of data and being constructed by applying the said third transformation method to the said second piece of data of the said data-element of the said third set;

the said mapper sending each data-element of the said fourth set in a fourth message to the partial-database identified in the said third piece of data of the said related data-element of the said third set; and each of the said partial-databases responding to the said fourth message by accepting it and updating the said fourth piece of data identified by the said fifth piece of data with the update information in the said seventh piece of data; and the querying of the said information records comprising steps of:

one of the said query terminals constructing a first query over the said information records, the said query consisting of a set of sub-queries and a description, each of the said sub-queries being a query over information stored at one of the said partial-databases and the said description being interpretable by the mapper and describing how to construct the answer to the said first query based on the answers to the said sub-queries and also based on the said correspondence information stored by the mapper during the storing of the said information records;

the said query terminal sending the said first query in a fifth message to the said mapper;

the said mapper responding to the said fifth message by submitting each of the said sub-queries to the relating partial-database in a sixth message;

each of the said partial-databases responding to the said sixth message by solving the said sub-query using the data-elements stored by the said partial-database and sending the resulting sub-query answer to the said mapper in a seventh message;

the said mapper responding to each the said seventh message by accepting it, combining all the said sub-query answers and the said stored correspondence information to a query answer according to the said first description, and sending the said query answer to the said query terminal in an eighth message; and the said query terminal responding to the said eighth message by accepting it.

29. In the method of claim 28, the said update terminal adding random padding to the input of the said first transformation method, before application of the said first transformation method, and the said mapper removing the said random padding from the output of the said second transformation method, after application of the said second transformation method.

30. In the method of claim 28, the said first transformation method being public key encryption with a first public cryptographic key of the said mapper and the said second transformation method being public-key decryption with a first secret cryptographic key of the said mapper, corresponding to the said first public cryptographic key.

31. In the method of claim 28, during the said storing of an information record, hiding each the said data part from all but the related update terminal and partial-database, by:

the said update terminal constructing the said first piece of data by first applying a fourth transformation method to the said data part so that the said data part and the result of the said fourth transformation method are substantially uncorrelated, and secondly applying to the result of the said fourth transformation method the said first transformation method, and each of the said update terminals furthermore applying a fifth transformation method to the said fourth piece of data, the said fifth transformation method being only known to the said update terminal and reversing the said fourth transformation method, and storing the result of the said fifth transformation method instead of the said fourth piece of data.

32. In the method of claim 31, during the said updating of a stored information record, hiding each the said update data part from all but the related update terminal and partial-database, by:

the said update terminal constructing the said sixth piece of data by first applying a fourth transformation method to the said update data part so that the said update data part and the result of the said fourth transformation method are substantially uncorrelated, and secondly applying to the result of the said fourth transformation method the said first transformation method, and each of the said update terminals furthermore applying a fifth transformation method to the said seventh piece of data, the said fifth transformation method being only known to the said update terminal and reversing the said fourth transformation method, and updating the said stored fourth piece of data using the result of the said fifth transformation method instead of the said seventh piece of data.

33. In the methods of claim 32, the said update terminal adding random padding to the input of the said fourth transformation method, before application of the said fourth transformation method; and the said partial-database removing the said random padding from the output of the said fifth transformation method, after application of the said fifth transformation method.

34. In the method of claim 32 the said fourth transformation method being public key encryption with a second public cryptographic key of the said partial-database and the said fifth transformation method being public-key decryption with a second secret cryptographic key of the said partial-database, corresponding to the said second public cryptographic key.

35. In the method of claim 28, during the said querying of stored information records, furthermore the answers to a group of the said sub-query being referenced in another the said sub-query, the mapper supplying the said answers together with the said sub-query containing the references to the said relating partial-database, and the said relating partial-database using the said answers when solving the said query.

36. In the method of claim 28, during the said querying of stored information records, the mapper furthermore controlling access to the said stored information records and information thereof by applying an access policy to the said query and declining the said query in case of a violation.

37. In the method of claim 28, the number of data retrieval control parties being increased by:
  replacing the said mapper by a mapper cascade;
  the first mapper of the said mapper cascade performing all functionality of the said replaced mapper; and
  during the storing of the said information records:
    all other mappers of the said mapper cascade only transforming the said fourth piece of data and the said fifth piece of data by applying the said second and third transformation method respectively and forwarding the result to the said partial update terminal via the neighboring mapper in the said mapper cascade, each the said second and third transformation method performed by a mapper in the said mapper cascade being only known to the said mapper; and
    the said update terminals constructing the said first piece of data by applying a cascade of first transformation method to the said information part, each first transformation method being related to a second transformation method performed by a mapper in the said mapper cascade, and the cascade of second transformation method as performed by the said mapper cascade reversing the said cascade of first transformation method; and
  during the updating of the said information records:
    all other mappers of the said mapper cascade only transforming the said seventh piece of data and the said fifth piece of data by applying the said second and third transformation method respectively and forwarding the result to the said partial update terminal via the neighboring mapper in the said mapper cascade, each the said second and third transformation method performed by a mapper in the said mapper cascade being only known to the said mapper; and
    the said update terminals constructing the said sixth piece of data by applying a cascade of first transformation method to the said update part, each first transformation method being related to a second transformation method performed by a mapper in the said mapper cascade, and the cascade of second transformation methods as performed by the said mapper cascade reversing the said cascade of first transformation method.

38. A method for introducing a pseudonym for an entity, involving a local terminal, a grouper, a first mapper and a matcher; updating a dossier on an entity using a pseudonym, involving a local terminal, a second mapper and a database; and, querying a dossier on an entity using a pseudonym, involving a local terminal, a grouper, the said second mapper and the said database;
  the introducing of the said pseudonym for the said entity comprising steps of:
    a local terminal obtaining a first piece of data containing information identifying the said entity and being interpretable by the said local terminal and by the said matcher;
    the said local terminal selecting a first pseudonym for the said entity, the said first pseudonym being previously unused and unique, the said first pseudonym and the said first piece of data being substantially uncorrelated, and the correspondence between the said first pseudonym and the said first piece of data being only known to the said local terminal;
    the said local terminal retaining the said first pseudonym and the said first piece of data and their correspondence;
    the said local terminal preparing a first message containing the said first pseudonym and a second piece of data, the said second piece of data being constructed by applying a first transformation method to the said first piece of data so that the said first piece of data and the said second piece of data are substantially uncorrelated, an inverse transformation method of the said first transformation method being only known to the said matcher;
    the said local terminal sending the said first message to the said first mapper;
    the said first mapper responding to the said first message by preparing a second message containing the said second piece of data and a second pseudonym, the said second pseudonym being constructed by applying a second transformation method to the said first pseudonym so that the said first pseudonym and the said second pseudonym are substantially uncorrelated, the said second transformation method being reproducible and only known to the said first mapper and the correspondence between the said first pseudonym and the said second pseudonym being only known to the said first mapper;
    the said first mapper sending the said second message to the said matcher;
    the said matcher responding to the said second message by constructing a third piece of data by applying a third transformation method to the said second piece of data, the said third transformation method reversing the said first transformation method and being only known to the said matcher;
    the said matcher retaining the identifying information of the said entity from the said third piece of data, retaining the said second pseudonym and retaining their correspondence;
    the said matcher searching, in all previously retained identifying information, for identifying information that matches the said received identifying information, the matching of identifying information being concluding that identifying information is related to the same entity;

the said matcher preparing a third message containing a fourth piece of data containing all retained pseudonyms corresponding to retained identifying information matching the said received identifying information;

the said matcher sending the said third message to the said first mapper;

the said first mapper responding to the said third message by preparing a fourth message containing a fifth piece of data containing the same number of pseudonyms as the said fourth piece of data, each of the said pseudonyms of the said fifth piece of data being constructed by applying a fourth transformation method to a different pseudonym of the said fourth piece of data, the said fourth transformation method reversing the said second transformation method and being only known to the said first mapper;

the said first mapper sending the said fourth message to the said grouper; and the said grouper responding to the said fourth message by retaining the correspondence between all pseudonyms of the said fifth piece of data; and the updating of a dossier on an entity comprising steps of:

a local terminal obtaining information, interpretable by the said local terminal, identifying the said entity, and retrieving a third pseudonym corresponding to the said identifying information;

the said local terminal preparing a fifth message containing the said third pseudonym and a sixth piece of data, the said sixth piece of data holding dossier update information, interpretable by the said database;

the said local terminal sending the said fifth message to the said second mapper;

the said second mapper responding to the said fifth message by preparing a sixth message containing the said sixth piece of data and a fourth pseudonym, the said fourth pseudonym being constructed by applying a fifth transformation method to the said third pseudonym so that the said third pseudonym and the said fourth pseudonym are substantially uncorrelated, the said fifth transformation method being reproducible and only known to the said second mapper and the correspondence between the said third pseudonym and the said fourth pseudonym being only known to the said second mapper;

the said second mapper sending the said sixth message to the said database; and the said database responding to the said sixth message by using the update information from the said sixth piece of data to update the retained dossier information corresponding to the said fourth pseudonym, and retaining the result of the said update; and the querying of a dossier on an entity comprising steps of:

a local terminal obtaining information, interpretable by the said local terminal, identifying the said entity, and retrieving a fifth pseudonym corresponding to the said identifying information;

the said local terminal preparing a seventh message containing the said fifth pseudonym and a query, the said query being a query over dossier information on the said entity retained at the said database and the said query being interpretable by the said database;

the said local terminal sending the said seventh message to the said grouper;

the said grouper responding to the said seventh message by preparing an eighth message containing the said query and an seventh piece of data, the said seventh piece of data containing a set holding all pseudonyms retained by the said grouper and corresponding to the said fifth pseudonym;

the said grouper sending the said eighth message to the said second mapper;

the said second mapper responding to the said eighth message by preparing a ninth message containing the said query and a eighth piece of data, the said eighth piece of data containing the same number of pseudonyms as the said seventh piece of data, each of the said pseudonyms of the said eighth piece of data being constructed by applying the said fifth transformation method to a different pseudonym of the said seventh piece of data;

the said second mapper sending the said ninth message to the said database;

the said database responding to the said ninth message by preparing a tenth message containing a ninth piece of data, the said ninth piece of data holding an answer to the said query, the said answer being interpretable by the said local terminal and being the result of solving the query over all retained dossier information related to the pseudonyms of the said eighth piece of data;

the said database sending the said tenth message to the said local terminal; and the said local terminal responding to the said tenth message by accepting it and processing the answer.

39. In the method of claim 38, furthermore multiple local terminals introducing pseudonyms for entities; updating dossiers on entities using pseudonyms; and querying dossiers on entities using pseudonyms involving the said grouper, the said first mapper, the said second mapper and the said database.

40. In the method of claim 38, the matching of identifying information being related to the same entity being highly probable, and the matching of identifying information not being related to the same entity being highly improbable.

41. In the method of claim 38, dossiers being retained for multiple different entities.

42. In the method of claim 38, the said local terminal using multiple different pseudonyms for one entity.

43. In the method of claim 38, the said first mapper furthermore retaining the correspondence between the said first pseudonym and the said second pseudonym and using this correspondence to mapping the pseudonyms in the said fourth piece of data to the pseudonyms in the said fifth piece of data instead of applying the said fourth transformation method.

44. In the method of claim 38, the said second mapper furthermore retaining the correspondence between the said third pseudonym and the said fourth pseudonym, and using this correspondence in subsequent updates of dossiers and queries over dossier mapping the said third pseudonym to the said fourth pseudonym and mapping the pseudonyms in the said seventh piece of data to the pseudonyms in eighth piece of data instead of applying the said fifth transformation method.

45. In the method of claim 38, during the introduction of the pseudonym, the said local terminal furthermore forcing involvement of the said first mapper, by the said local terminal constructing the said second piece of data by first applying a sixth transformation method to the said first piece of data, an inverse transformation method of the said sixth transformation method being only known to the said first mapper, and secondly applying to the result thereof the said first transformation method; and the said first mapper, before preparing the said second message, furthermore applying a seventh transformation method to the said second piece of data, the said seventh transformation method reversing the said sixth transformation method and being only known to the said first mapper.

46. In the method of claim 45, the said local terminal adding random padding to the input of the said first and sixth transformation method, before application of the said first and sixth transformation method; the said first mapper removing the said random padding from the output of the said seventh transformation method, after application of the said seventh transformation method; and, the said database removing the said random padding from the output of the said third transformation method, after application of the said third transformation method.

47. In the method of claim 45, the said sixth transformation method being public key encryption with a second public cryptographic key of the said first mapper and the said seventh transformation method being public-key decryption with a second secret cryptographic key of the said first mapper, corresponding to the said second public cryptographic key.

48. In the method of claim 38, the said first transformation method being public key encryption with a first public cryptographic key of the said matcher and the said third transformation method being public-key decryption with a first secret cryptographic key of the said matcher, corresponding to the said first public cryptographic key.

49. In the method of claim 38, during the updating and querying of dossiers, the said local terminal furthermore forcing involvement of the said second mapper, by the said local terminal, before preparing the said fifth message, applying an eighth transformation method to the said sixth piece of data, an inverse transformation method of the said eighth transformation method being only known to the said second mapper; and the said second mapper, before preparing the said sixth message, furthermore applying a ninth transformation method to the said second piece of data, the said ninth transformation method reversing the said eighth transformation method and being only known to the said second mapper.

50. In the method of claim 49, during the updating and querying of dossiers, the said local terminal furthermore hiding the said update information from the said second mapper, by the said local terminal, before preparing the said fifth message, after applying said eighth transformation method to the said sixth piece of data, applying a tenth transformation to the result of the said eighth transformation method, an inverse transformation method of the said tenth transformation method being only known to the said database; and the said database, after receiving the said sixth message, furthermore applying an eleventh transformation method to the said sixth piece of data, the said eleventh transformation method reversing the said tenth transformation method and being only known to the said database.

51. In the method of claim 50, the said local terminal adding random padding to the input of the said eighth and tenth transformation methods, before application of the said eighth and tenth transformation methods; the said second mapper removing the said random padding from the output of the said ninth transformation method, after application of the said ninth transformation method; and, the said database removing the said random padding from the output of the said tenth transformation method, after application of the said tenth transformation method.

52. In the method of claim 50, the said tenth transformation method being public key encryption with a fourth public cryptographic key of the said database and the said eleventh transformation method being public-key decryption with a fourth secret cryptographic key of the said database, corresponding to the said fourth public cryptographic key.

53. In the method of claim 49, the said eighth transformation method being public key encryption with a third public cryptographic key of the said second mapper and the said ninth transformation method being public-key decryption with a third secret cryptographic key of the said second mapper, corresponding to the said third public cryptographic key.

54. In the method of claim 38, the said query furthermore being interpretable by the said second mapper, and during the said querying of stored information records, the said second mapper furthermore controlling access to the said retained dossiers and information thereof, by applying an access policy to the said query and declining the said query in case of a violation.

* * * * *